US012096724B2

(12) United States Patent
Cox, IV et al.

(10) Patent No.: US 12,096,724 B2
(45) Date of Patent: Sep. 24, 2024

(54) AERIAL TREE TRIMMING SYSTEM AND METHOD INCLUDING ELECTRIC-POWERED AERIAL SAW APPARATUS

(71) Applicant: Aerial Solutions, Inc., Tabor City, NC (US)

(72) Inventors: William Cleveland Cox, IV, Tabor City, NC (US); Ashley Lewis Bellamy, Tabor City, NC (US); Joshua Thomas Perry, Williston, SC (US); Byron Jennings Woodruff, Calabash, NC (US)

(73) Assignee: Aerial Solutions, Inc., Tabor City, NC (US)

( * ) Notice: Subject to any disclaimer, the term of this patent is extended or adjusted under 35 U.S.C. 154(b) by 408 days.

(21) Appl. No.: 17/331,829

(22) Filed: May 27, 2021

(65) Prior Publication Data

US 2022/0377990 A1    Dec. 1, 2022

(51) Int. Cl.
*A01G 23/095* (2006.01)
*A01G 3/08* (2006.01)
*B64D 1/22* (2006.01)

(52) U.S. Cl.
CPC ........... *A01G 23/095* (2013.01); *A01G 3/085* (2013.01); *B64D 1/22* (2013.01)

(58) Field of Classification Search
CPC .... A01G 23/08; A01G 23/083; A01G 23/091; A01G 23/095; A01G 3/04; A01G 3/085
USPC ...................................................... 144/24.13
See application file for complete search history.

(56) References Cited

U.S. PATENT DOCUMENTS

| 3,566,526 | A | 3/1971 | La Violette |
| 3,688,952 | A | 9/1972 | Barlow et al. |
| 3,746,177 | A | 7/1973 | Vilotti |
| 4,554,781 | A | 11/1985 | Rogers |
| 4,815,263 | A | 3/1989 | Hartung et al. |
| 4,936,038 | A | 6/1990 | Johnson et al. |
| 4,984,757 | A | 1/1991 | Hartung et al. |
| D346,950 | S | 5/1994 | Dunn |
| 5,417,304 | A | 5/1995 | Kurtgis |
| D359,411 | S | 6/1995 | Miller |
| 3,266,633 | A | 8/1996 | Graebner |
| 5,850,991 | A | 12/1998 | Hainsworth et al. |
| 5,937,559 | A | 8/1999 | Jennen |
| 5,961,070 | A | 10/1999 | Bradford et al. |

(Continued)

FOREIGN PATENT DOCUMENTS

| DE | 102015002324 | * | 2/2015 | |
| FI | 122994 B1 | * | 9/2012 | ............. B27B 31/00 |
| WO | WO-2004103063 A1 | * | 12/2004 | ........... A01G 23/095 |

*Primary Examiner* — Matthew Katcoff
(74) *Attorney, Agent, or Firm* — Ward and Smith, P.A.; Ryan K. Simmons

(57) ABSTRACT

An aerial vegetation trimming system. The aerial vegetation trimming system may include a saw assembly, wherein the saw assembly may include a plurality of saw blades disposed along a length of a beam. The aerial vegetation trimming system may further include an electric motor operatively connected to the saw assembly, wherein the electric motor is configured to drive the plurality of saw blades; and at least one boom disposed between the electric motor and a vehicle, wherein the at least one boom is configured to connect the saw assembly to the vehicle.

20 Claims, 40 Drawing Sheets

(56) References Cited

U.S. PATENT DOCUMENTS

| | | | |
|---|---|---|---|
| D449,977 S | 11/2001 | Dembowiak et al. | |
| 6,394,156 B1 | 5/2002 | Ahvenlampi et al. | |
| 640,896 A1 | 6/2002 | Moon | |
| 6,425,560 B1 | 7/2002 | Dembowiak et al. | |
| 6,491,271 B1 | 12/2002 | Adams | |
| 6,793,184 B2 | 9/2004 | Dougal et al. | |
| 7,963,406 B2 | 6/2011 | Kinsella | |
| 8,534,608 B1 * | 9/2013 | Cox, IV | A01G 23/095 244/137.4 |
| 9,456,559 B2 | 10/2016 | Dunn | |
| 10,624,279 B1 * | 4/2020 | Mead | A01G 23/093 |
| 10,869,433 B1 * | 12/2020 | Haddock | B23D 45/003 |
| 11,352,237 B2 * | 6/2022 | Ragnarsson | B66C 3/005 |
| 11,696,536 B2 * | 7/2023 | Clark | B64D 1/22 144/34.1 |
| 2003/0159757 A1 | 8/2003 | Tingstad | |
| 2004/0000409 A1 | 1/2004 | Abbott | |
| 2008/0105332 A1 | 5/2008 | Lippits | |
| 2009/0000699 A1 * | 1/2009 | Savege | A01G 23/093 144/337 |
| 2014/0299230 A1 | 10/2014 | Cox | |
| 2016/0205872 A1 * | 7/2016 | Chan | A01G 3/086 |

* cited by examiner

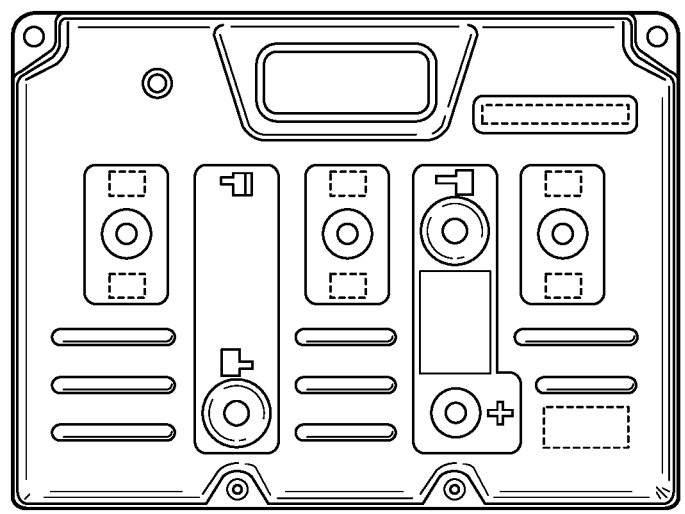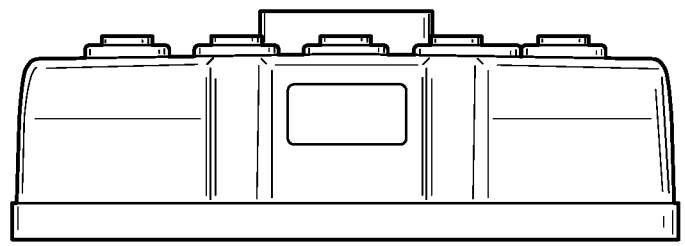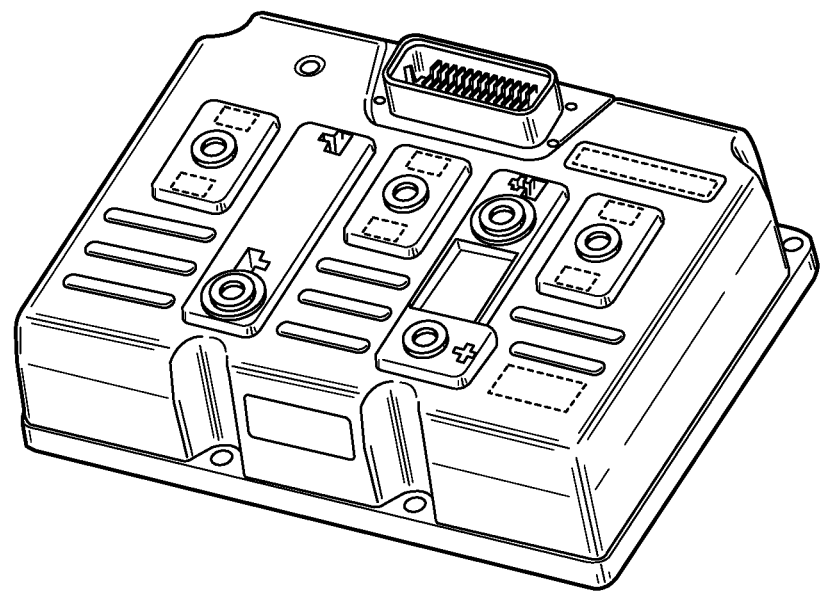
FIG. 14

(TOP)

(BOTTOM)

(SIDE)

(SIDE)

(SIDE)

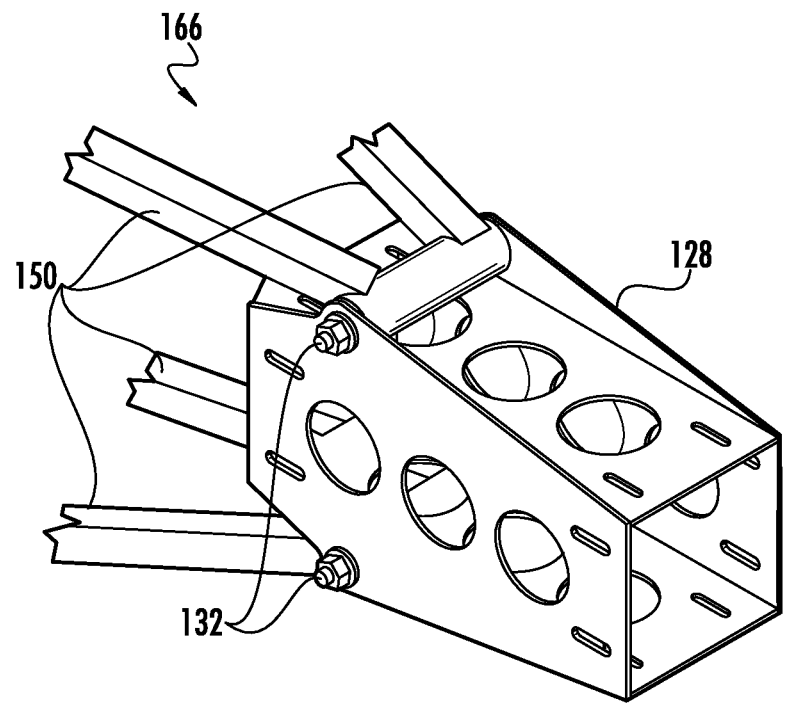
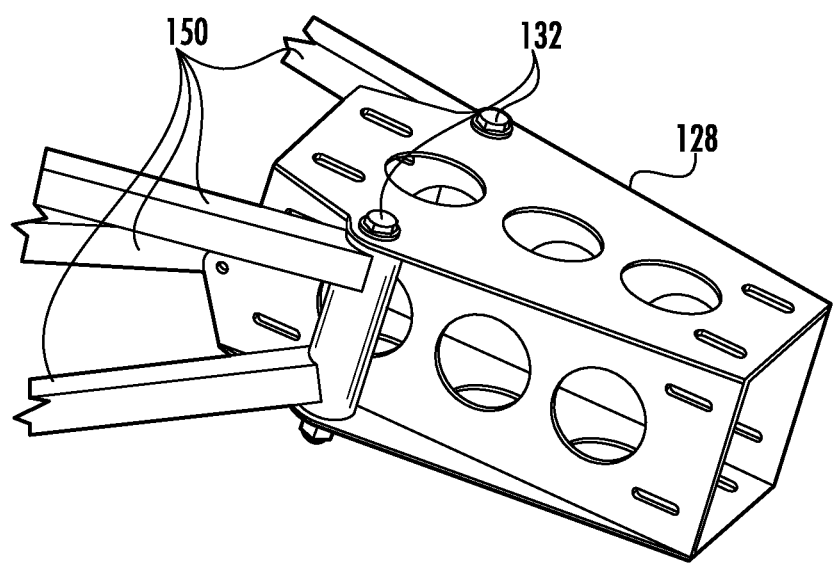
FIG. 30

(FRONT)

(BACK)

(SIDE)

(SIDE CUTAWAY)

AERIAL TREE TRIMMING SYSTEM AND METHOD INCLUDING ELECTRIC-POWERED AERIAL SAW APPARATUS

RELATED APPLICATIONS

This application is related and claims priority to U.S. Provisional Patent Application No.: 63/052,118, filed on Jul. 15, 2020, the application of which is incorporate herein by reference in its entirety.

TECHNICAL FIELD

The presently disclosed subject matter relates generally to tree trimming systems and methods, and more particularly to an aerial tree trimming system and method including electric-powered aerial saw apparatus.

BACKGROUND

It is known to trim tree limbs and other vegetation alongside power lines (e.g., side trimming of rights-of-way) using an airborne system comprised, for example, of a helicopter having a trimming apparatus suspended beneath the helicopter. Further, in these airborne systems, the trimming apparatus may be a motorized arrangement of saw blades and wherein the motor is typically gasoline powered. There are certain drawbacks with respect to gas-powered trimming apparatuses. For example, in gas-powered trimming apparatuses the amount of fuel they can carry may be limited, causing work to be interrupted for refueling stops and requiring a bulk fuel supply on site. Further, there is risk with respect to using a suspended trimming apparatus carrying a flammable substance, such as gasoline. Further, the design of gas-powered trimming apparatuses can be complex.

SUMMARY

In one embodiment, an aerial vegetation trimming system is provided. The aerial vegetation trimming system may include a saw assembly, wherein the saw assembly may include a plurality of saw blades disposed along a length of a beam. The aerial vegetation trimming system may further include an electric motor operatively connected to the saw assembly, wherein the electric motor is configured to drive the plurality of saw blades; and at least one boom disposed between the electric motor and a vehicle, wherein the at least one boom is configured to connect the saw assembly to the vehicle. The vehicle may include a helicopter. The electric motor may be housed within a housing. The system may further include a battery assembly, wherein the battery assembly is configured to provide power to the electric motor. The battery assembly may include one or more rechargeable batteries. The system may further include a battery charging station. The system may further include a quick change connector, wherein the quick change connector may have a first end configured to be mechanically coupled to the housing of the electric motor and may have a second end configured to mate with an upper end portion of the beam. The quick change connector may be configured to allow for interchangeability of differing saw assemblies with the electric motor. The system may further include one or more boom extension couplings, wherein the one or more boom extension couplings may be configured to couple two or more booms together in an end to end configuration. A lower most end of the at least one boom may be connectable to the electric motor housing, and wherein an upper most end of the at least one boom may be connectable to the vehicle. The plurality of saw blades may be aligned in a common vertical plane. The system may further include any one or more of a motor controller operatively connected to the electric motor and configured for controlling one or more operations of the electric motor, a radio controller module configured to provide a wireless communications link to the motor controller and configured to provide for wireless operations thereof; a system status indicator; and a battery charger module. The motor controller may be configured to increase or decrease rpms of the electric motor based on one or more parameters and/or health conditions of the aerial vegetation trimming system. The one or more parameters and/or health conditions may include one or more of load detected at the saw assembly, battery condition, component temperature, and torque. The motor controller may be configured to provide a low rpm startup of the electric motor at initial engagement. The motor controller may be configured to provide regenerative deceleration of the electric motor. The system status indicator may include a light bar system, wherein the light bar system may be configured to provide a one or more visual indicators of one or more operating parameters and/or health conditions of the aerial vegetation trimming system. The system may further include an onboard battery charging station, wherein the onboard battery charging station may be configured to provide charging to one or more of the one or more rechargeable batteries while the system is connected to the vehicle. The electric motor drives the plurality of saw blades via a belt and pulley system. The belt and pulley system may be at least partially housed within a hollow portion of the beam. The system may further include an emergency release mechanism for attaching the aerial vegetation trimming system to the vehicle. The emergency release mechanism may include a connector having an upper end with a first hook attachment point, a lower end with a load attachment point, and a second hook attachment point; a first release hook mounted to a chassis of the vehicle and releasably attachable to the first hook attachment point; and a second release hook mounted to a frame structure to which the aerial vegetation trimming system is mounted and releasably attachable to the second hook attachment point, wherein the load is not released unless both hooks are released.

In another embodiment, a method of using an aerial vegetation trimming system is provided. The method may include providing an aerial vegetation trimming system. The aerial vegetation trimming system may include a saw assembly, wherein the saw assembly may include a plurality of saw blades disposed along a length of a beam; an electric motor operatively connected to the saw assembly, wherein the electric motor is configured to drive the plurality of saw blades; and at least one boom disposed between the electric motor and a vehicle, wherein the at least one boom is configured to connect the saw assembly to the vehicle. The method may further include connecting the aerial vegetation trimming system to the vehicle; positioning the vehicle with the aerial vegetation trimming system connected thereto in a desired area for vegetation trimming; activating the plurality of saw blades of the saw assembly; and performing aerial vegetation trimming operations.

BRIEF DESCRIPTION OF THE DRAWINGS

Figure 1:
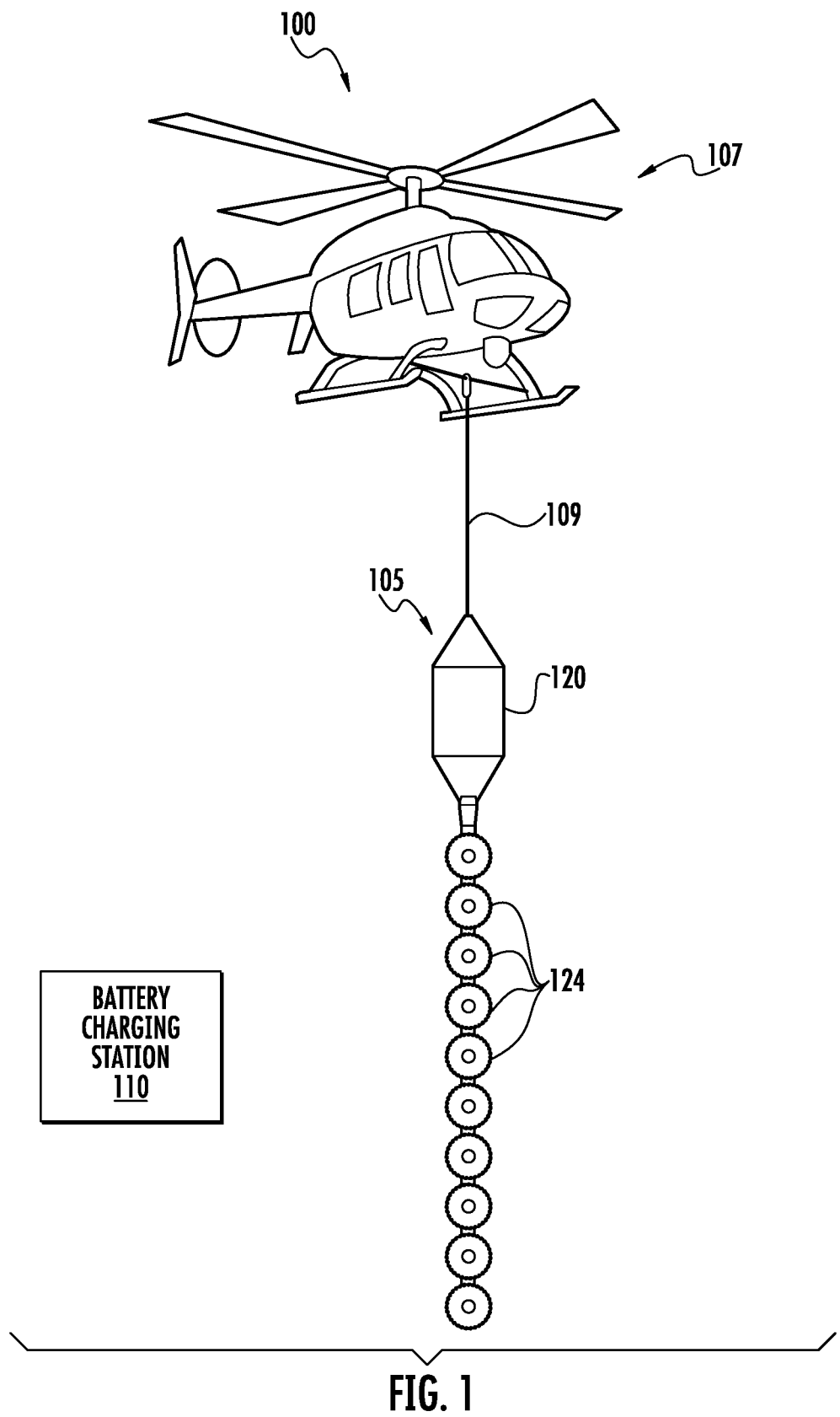
Figure 2:
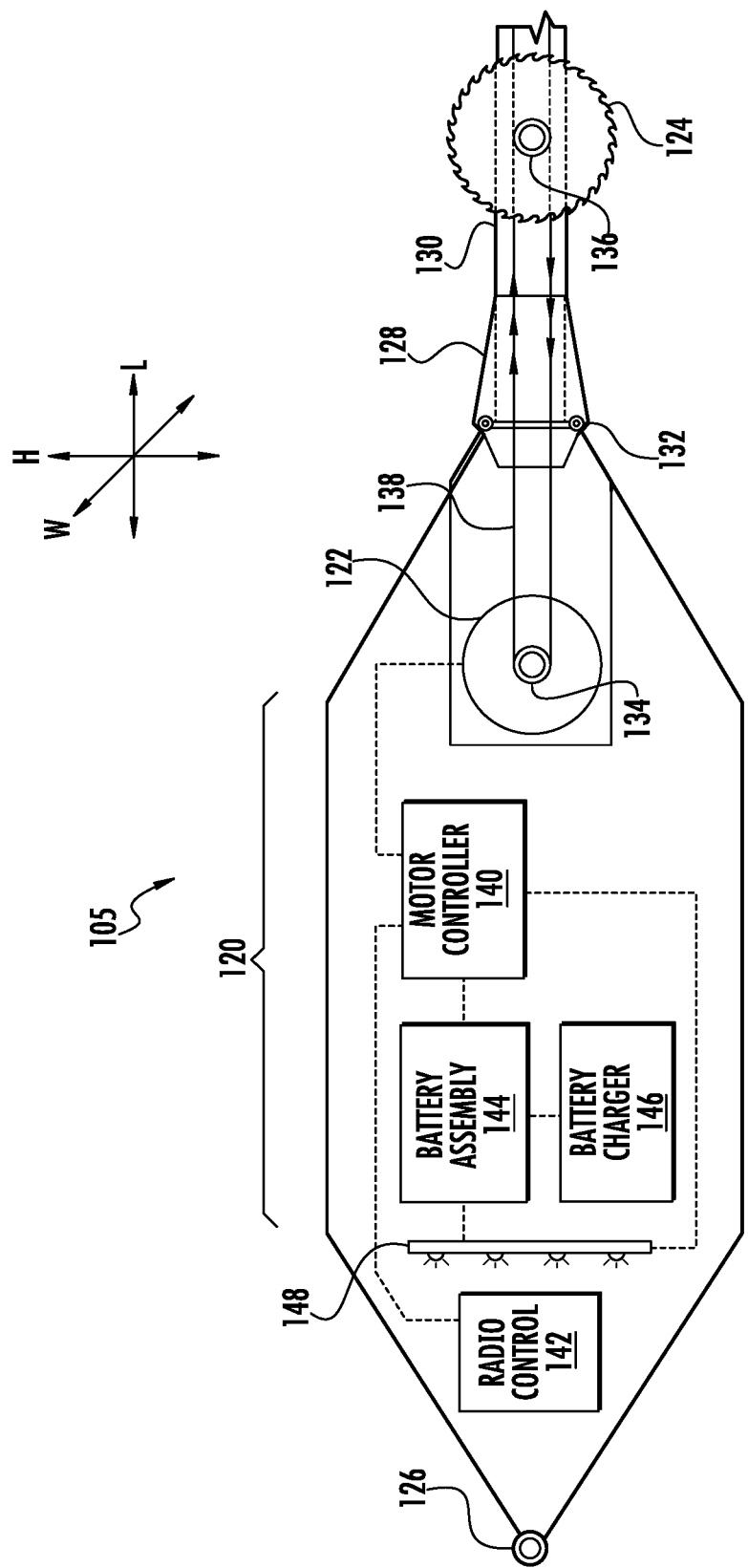
Figure 13:
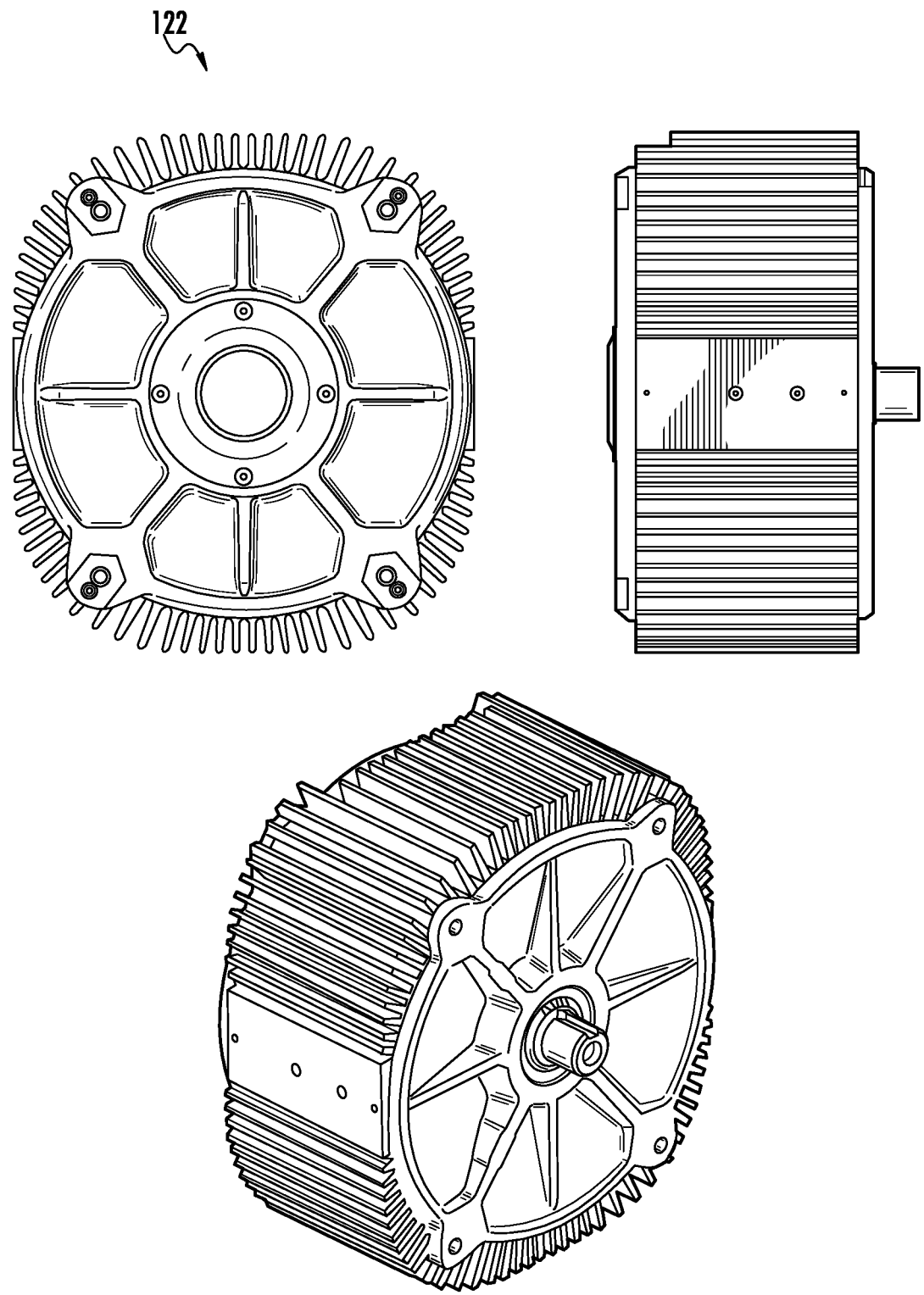
Figure 15:
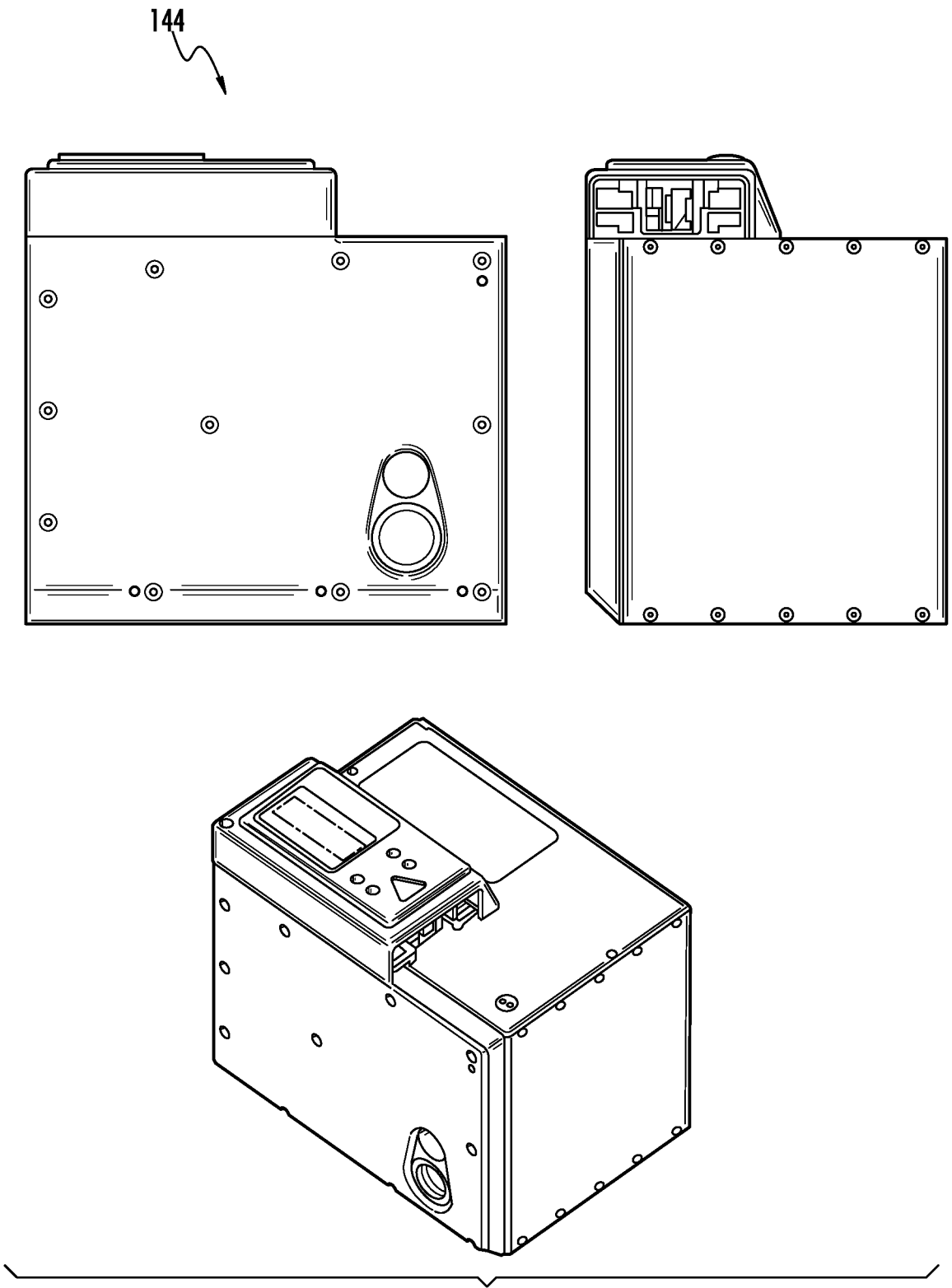
Figure 16:
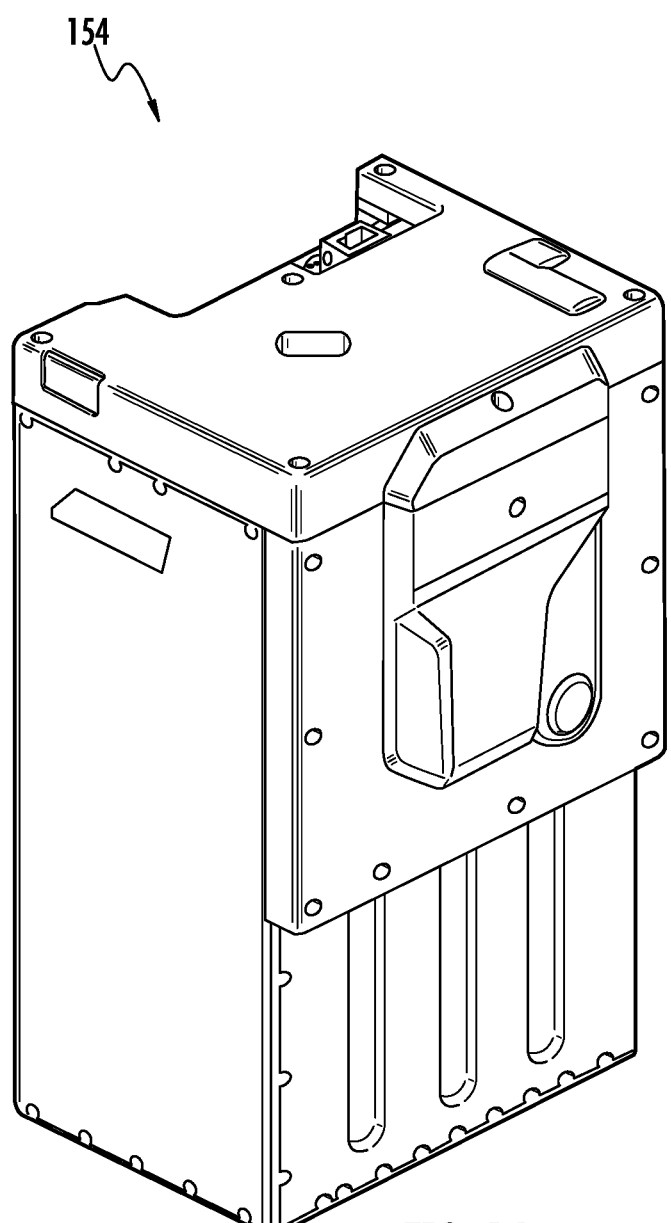
Figure 17:
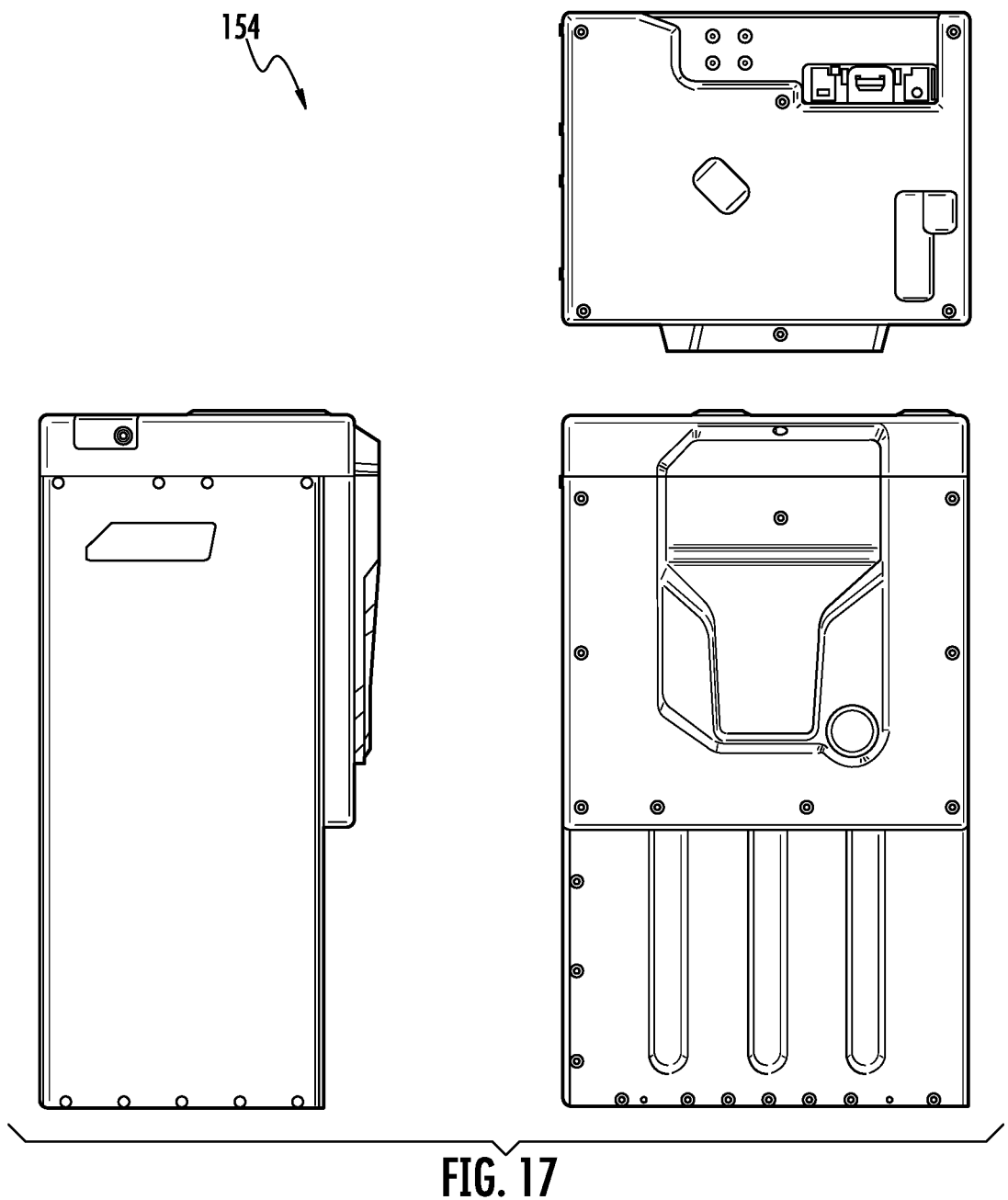
Figure 18:
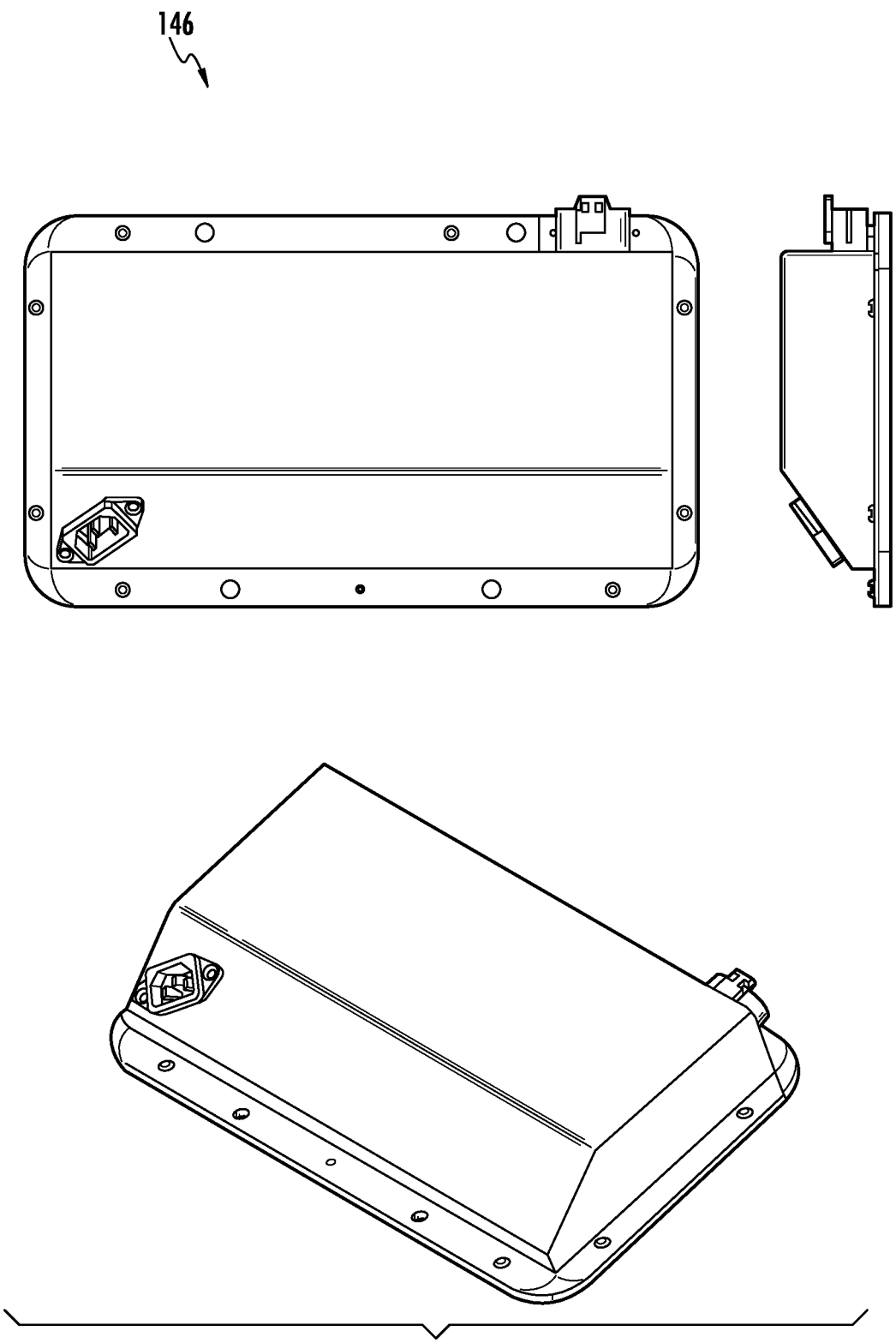
Figure 19:
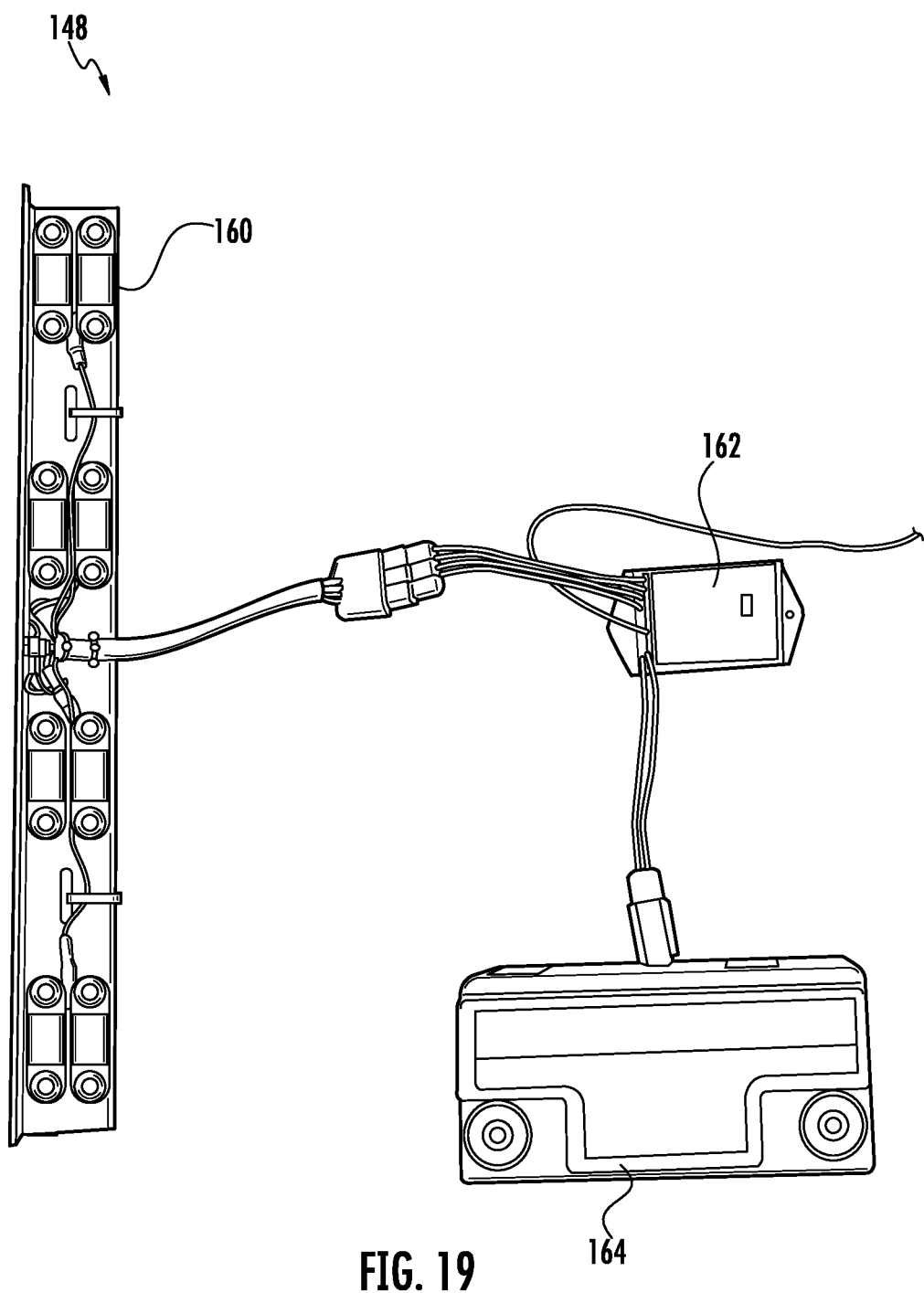
Figure 20:
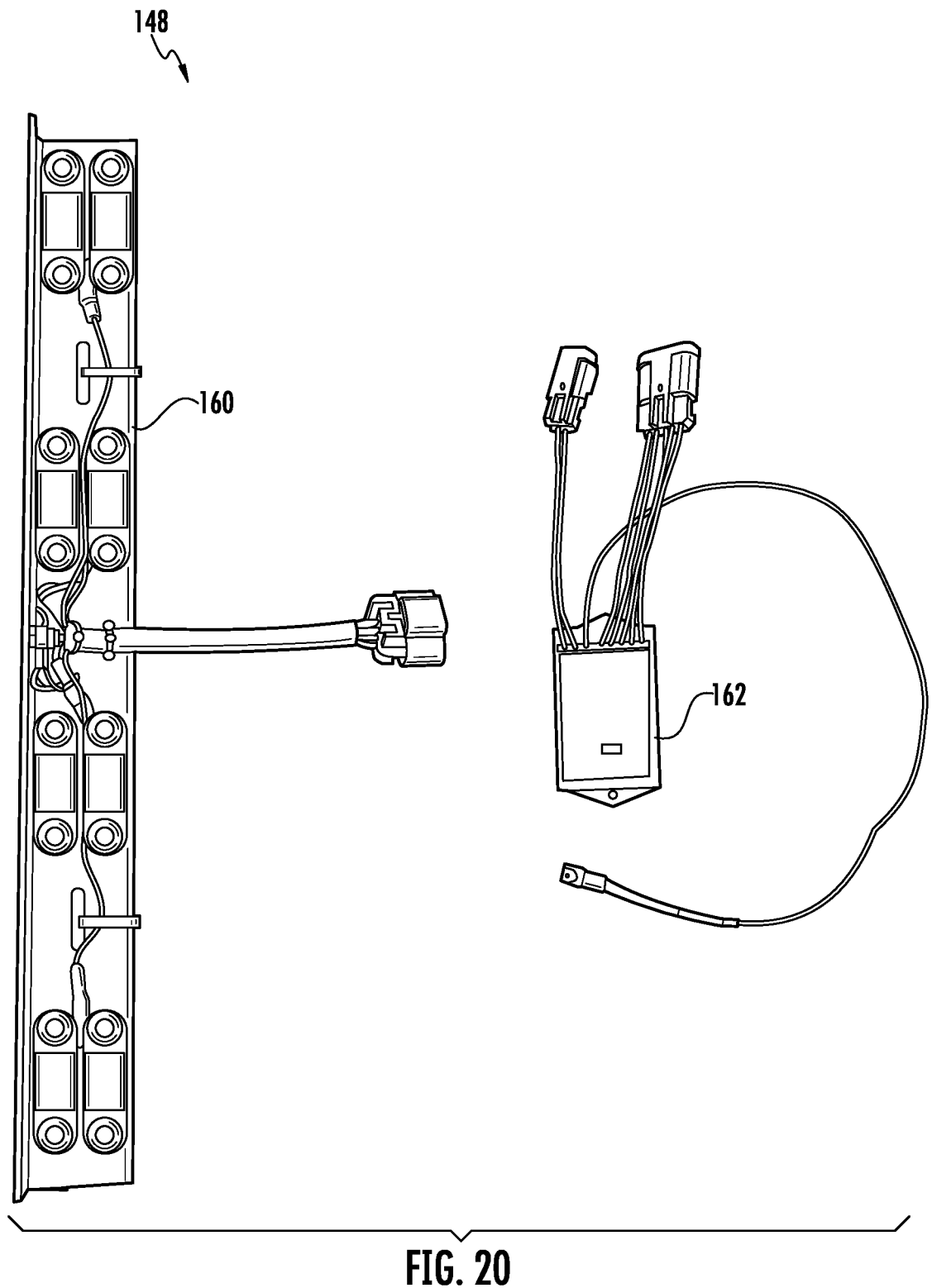
Figure 21:
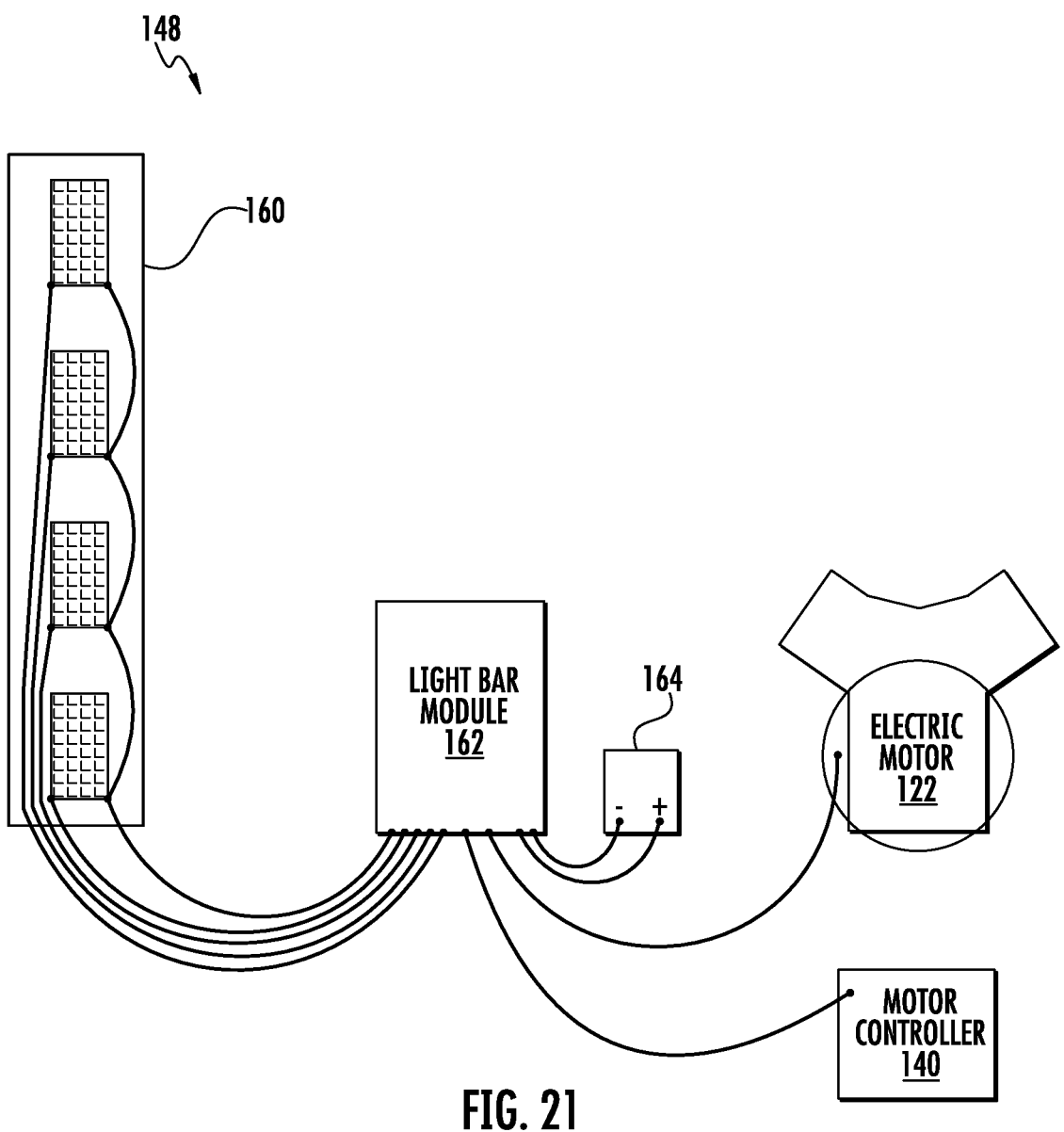
Figure 22:
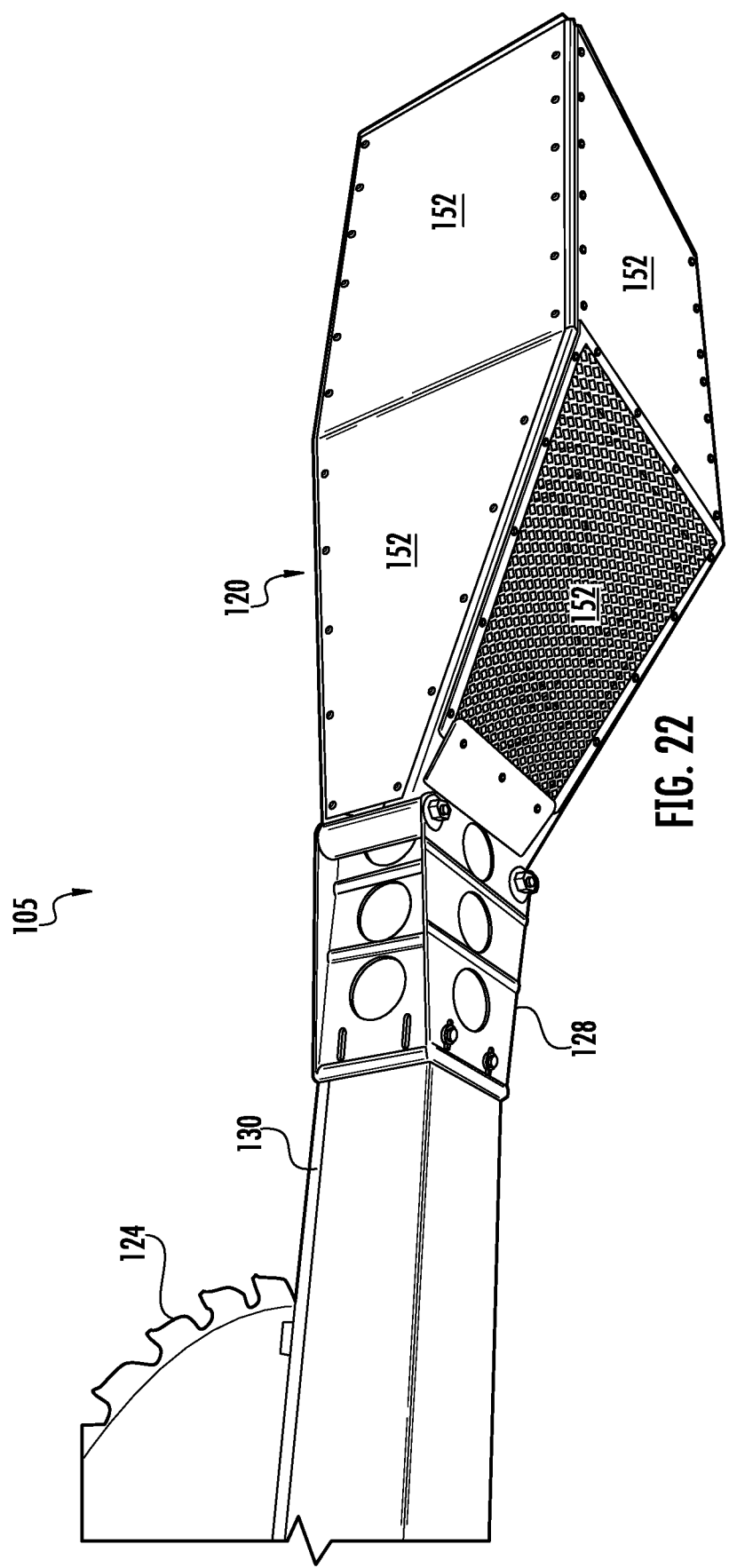
Figure 23:
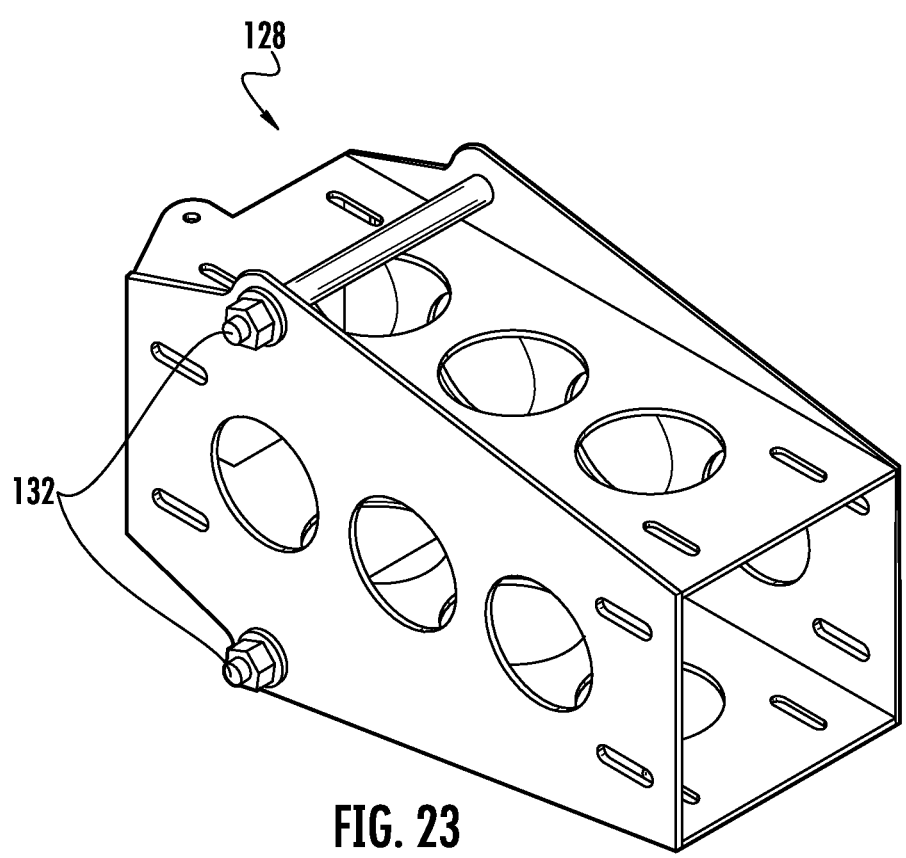
Figure 24:
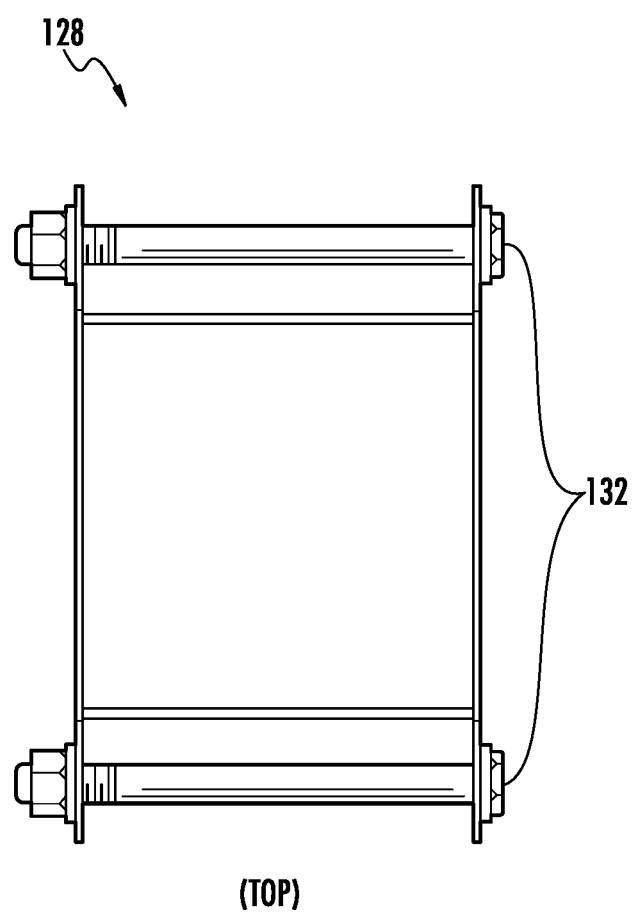
Figure 25:
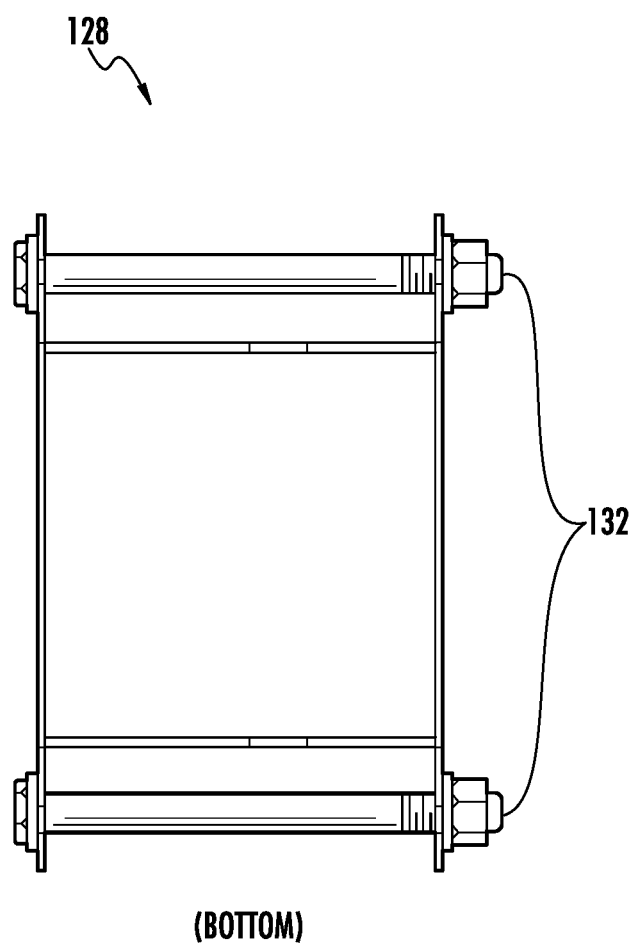
Figure 26:
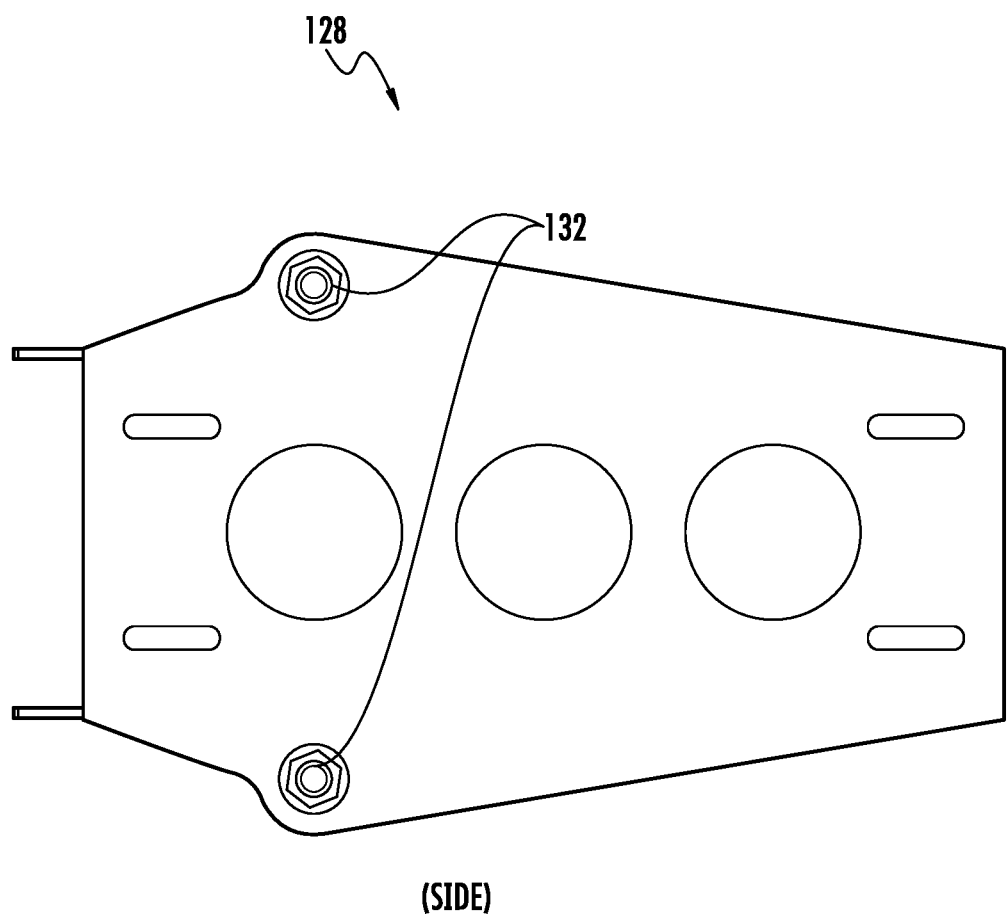
Figure 27:
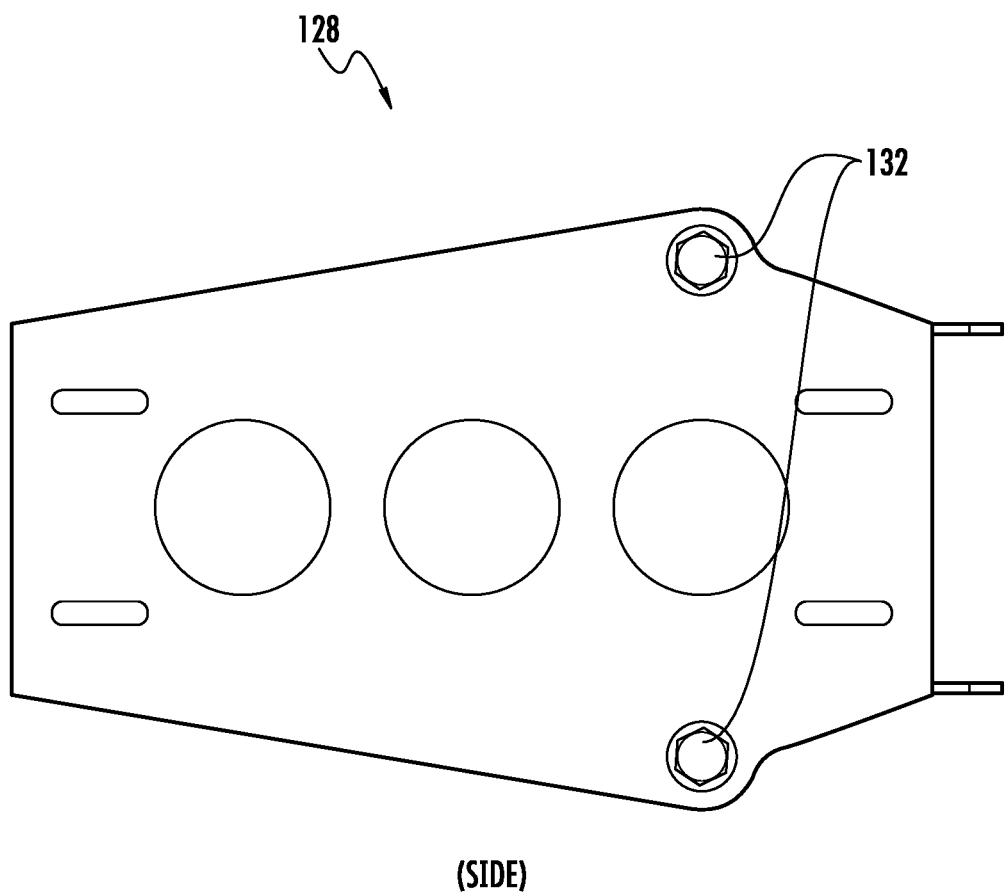
Figure 28:
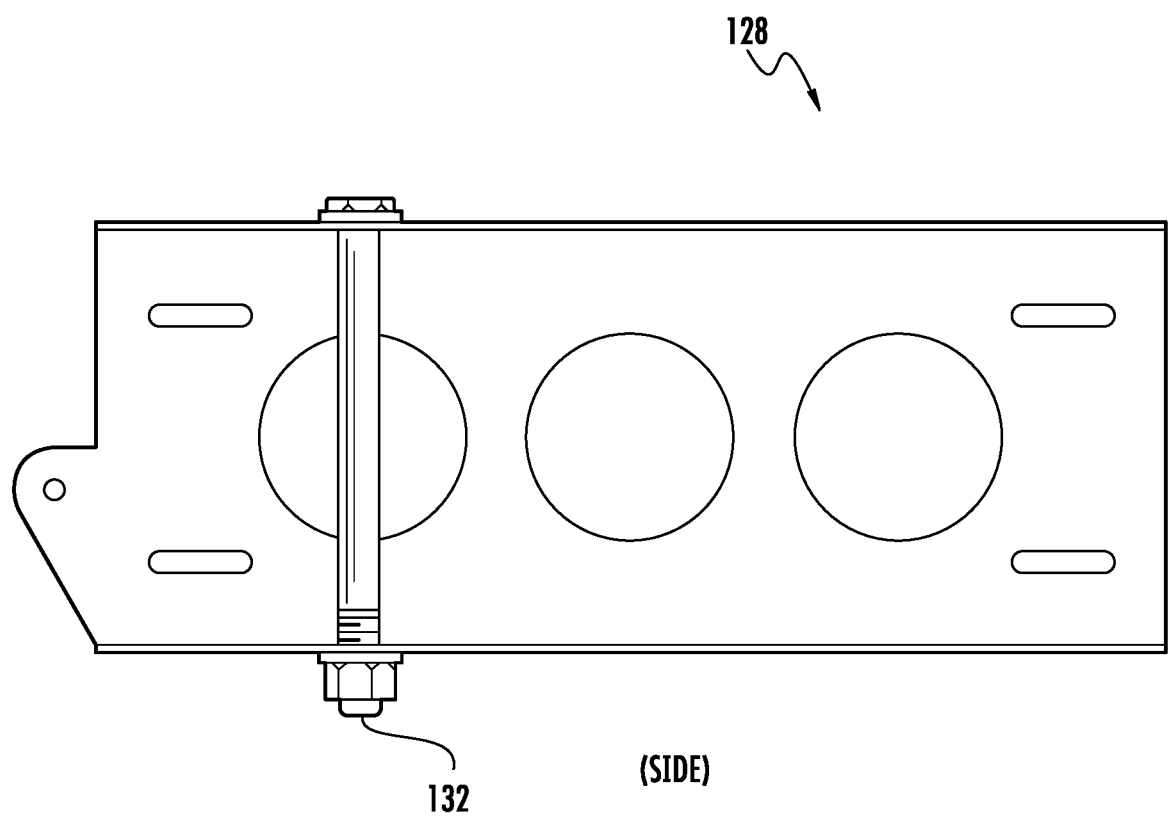
Figure 29:
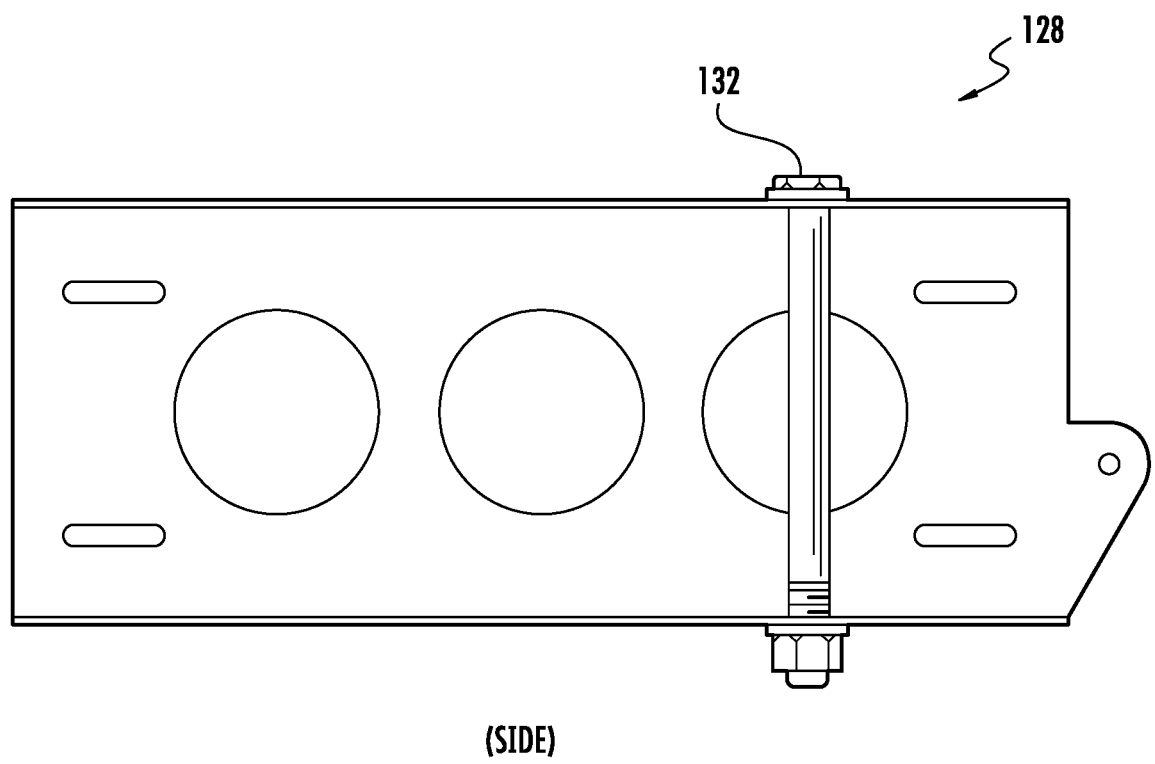
Figure 31:
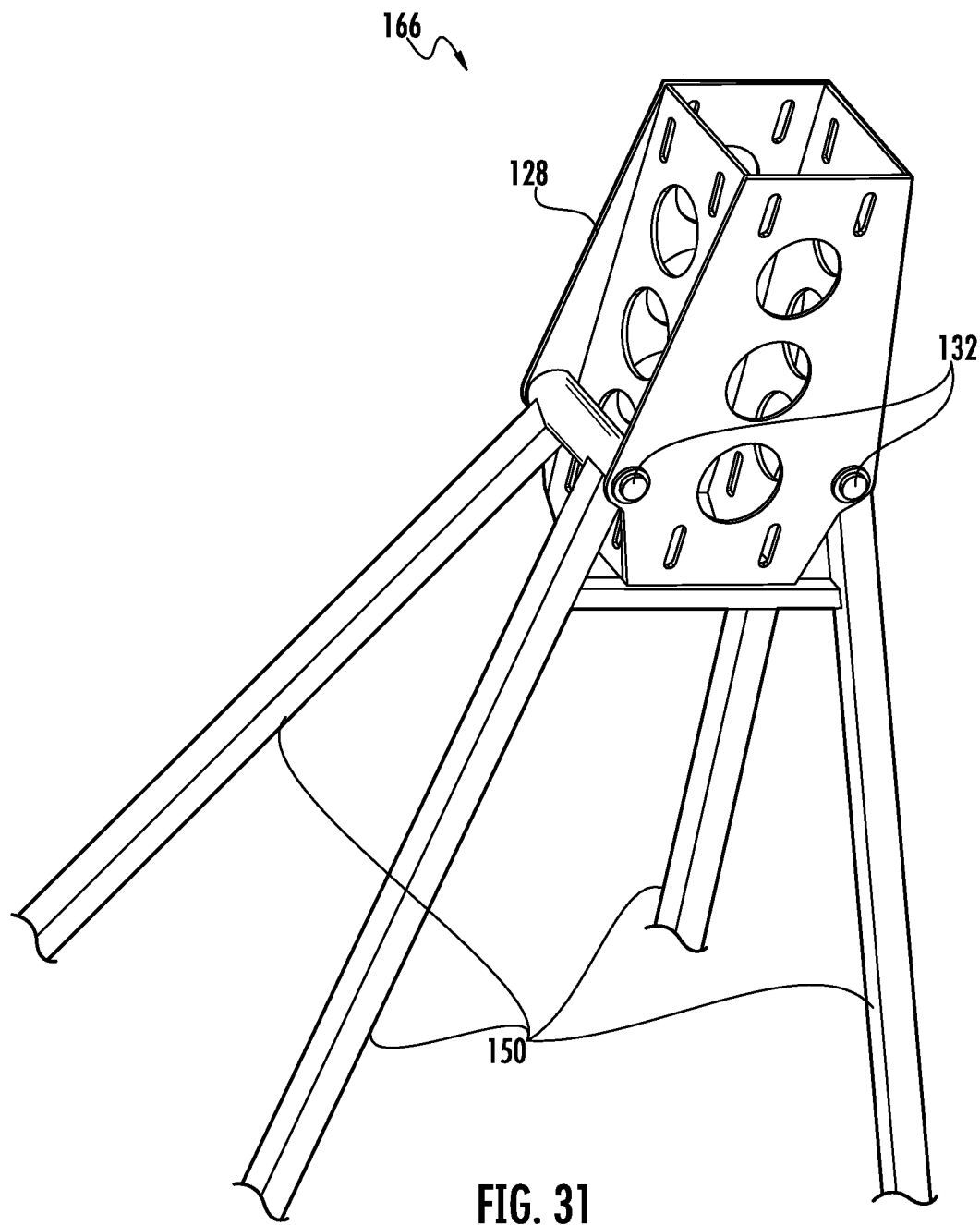
Figure 32:
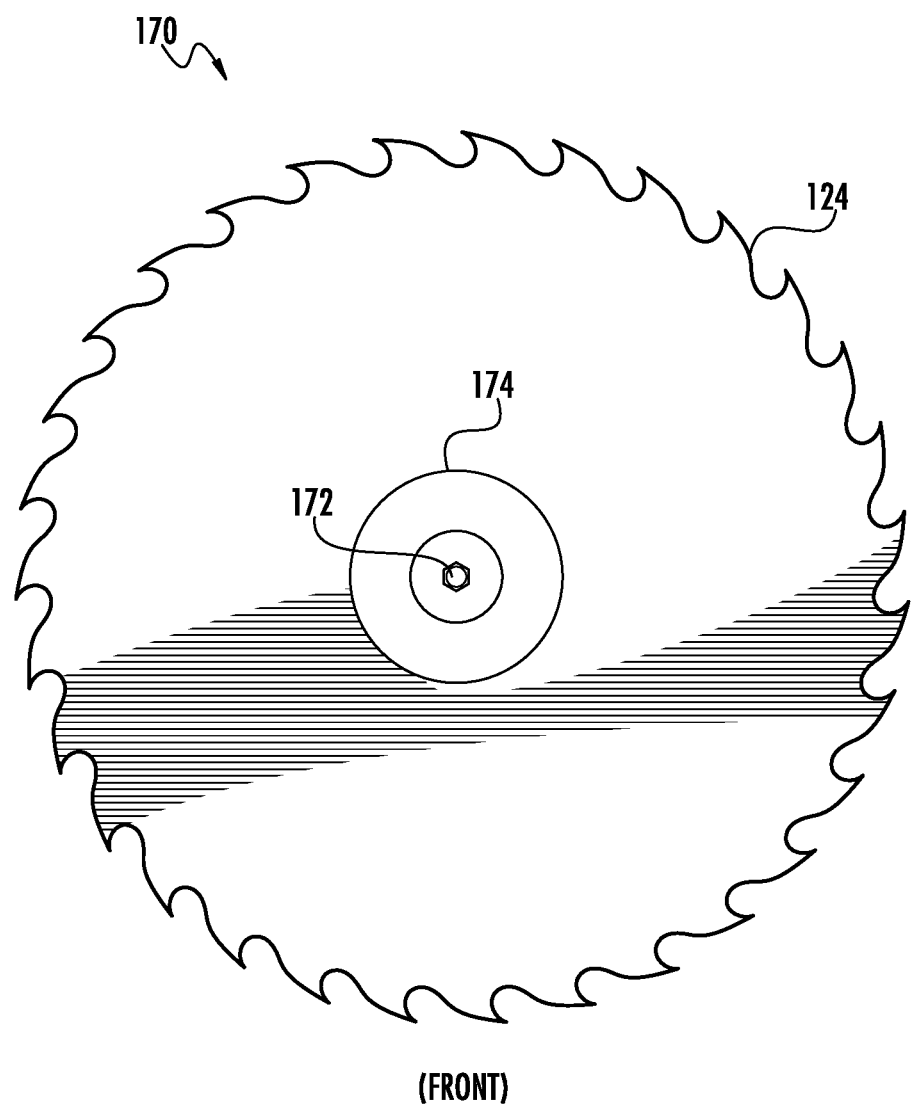
Figure 33:
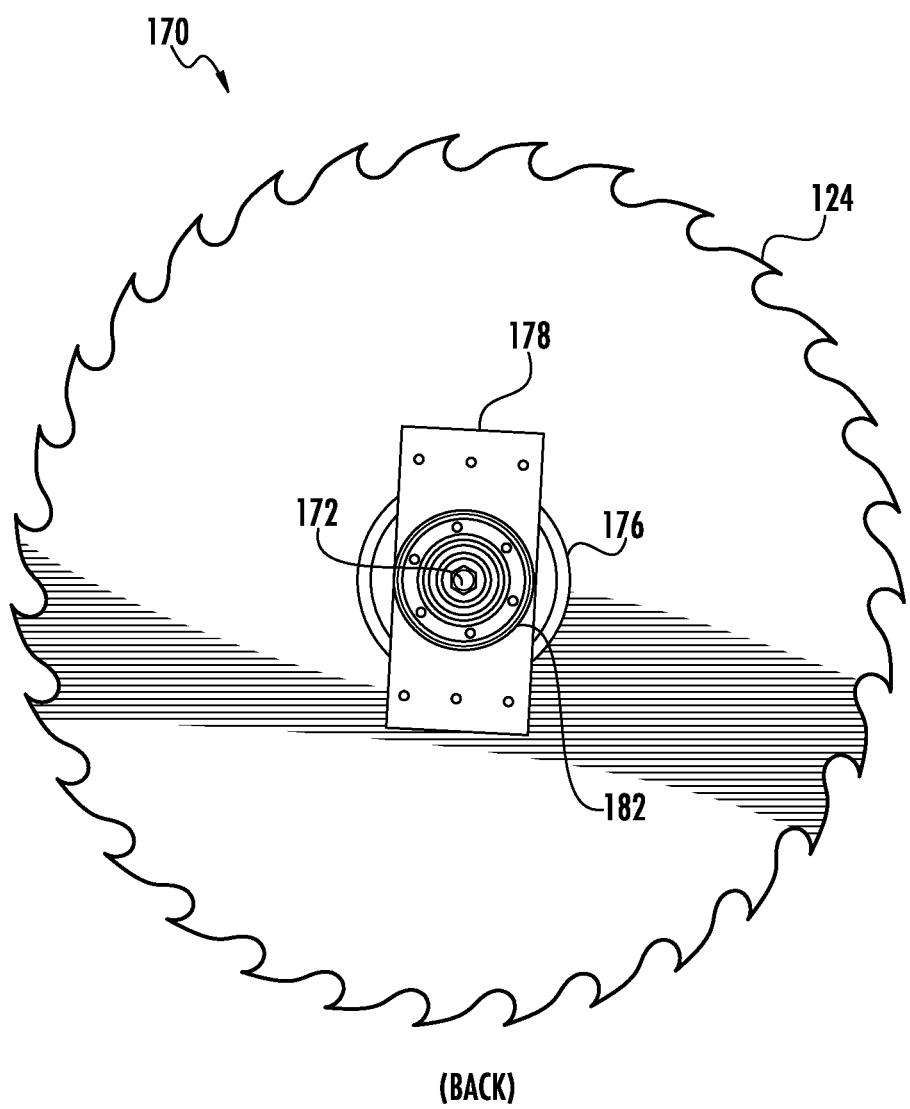
Figure 34:
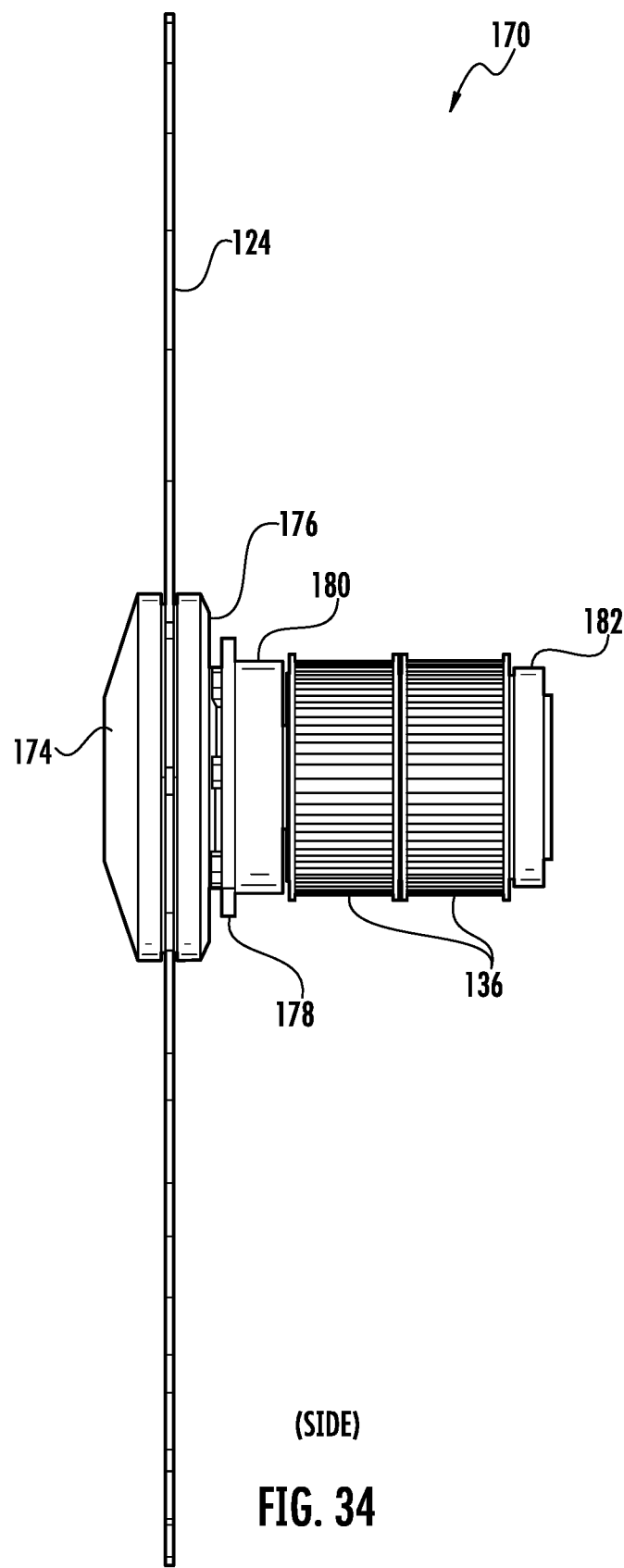
Figure 35:
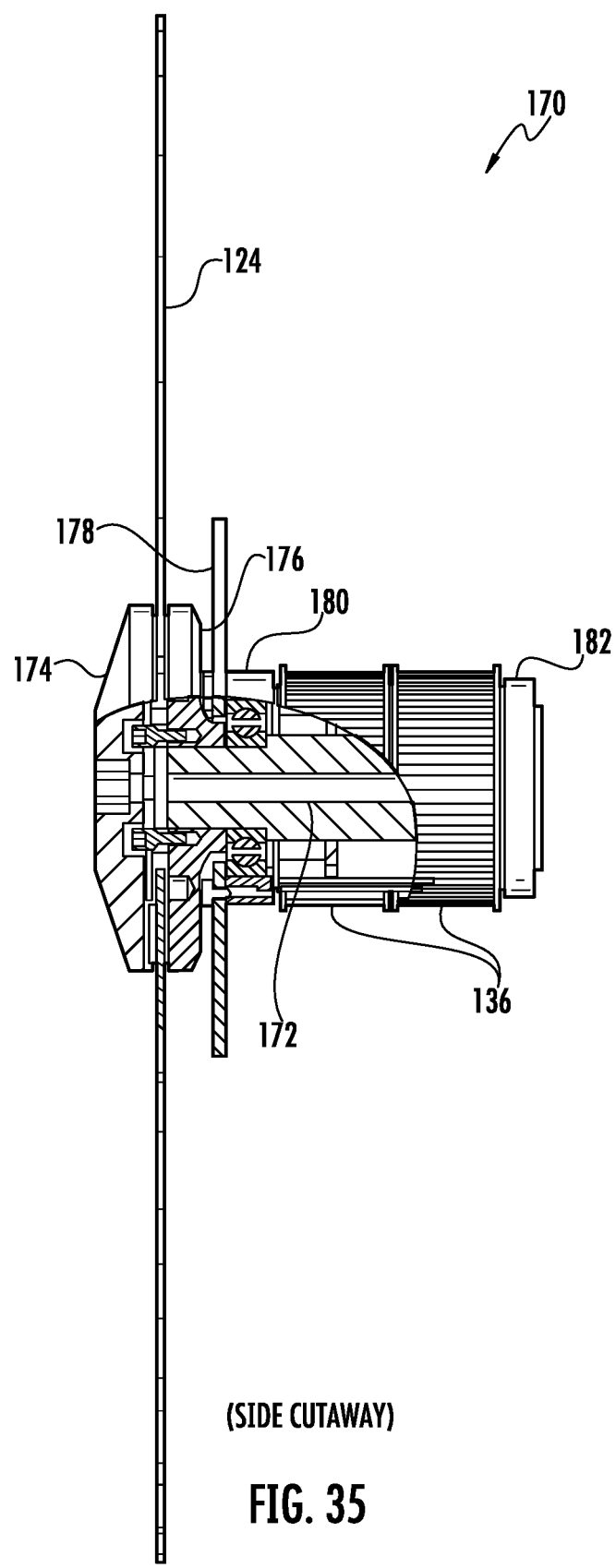
Figure 36:
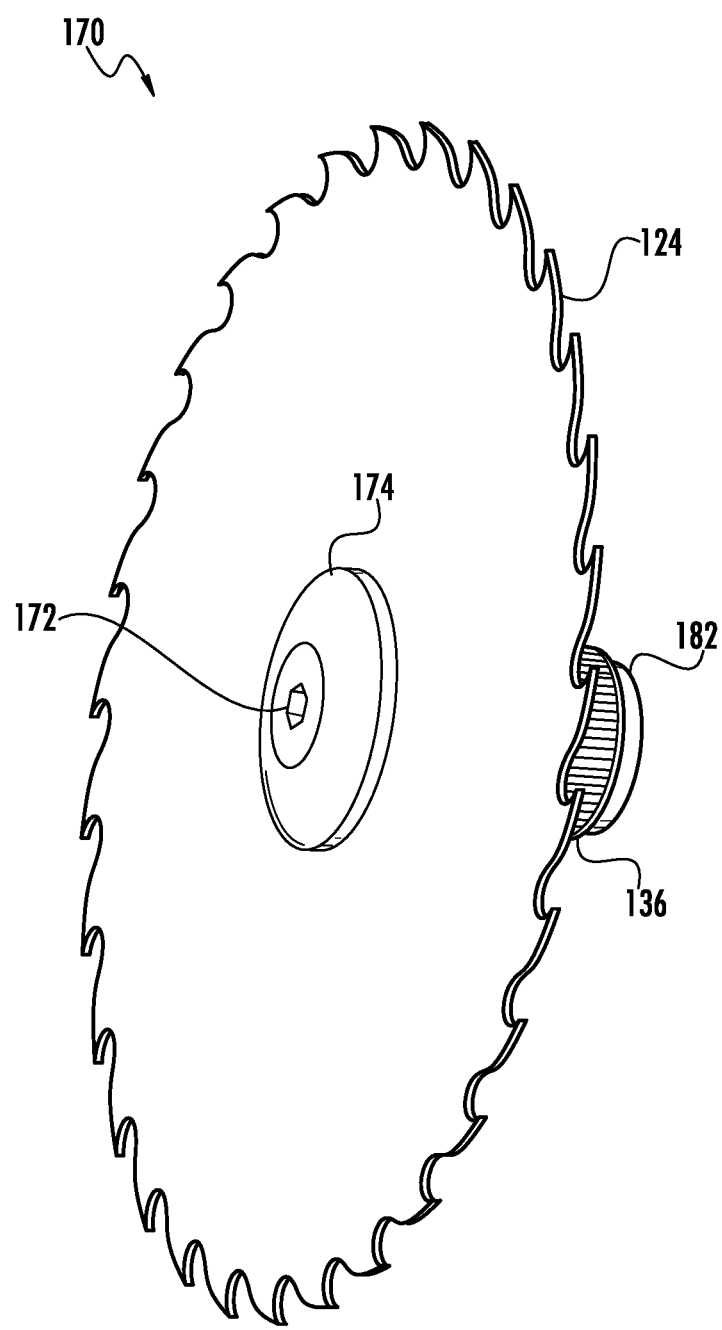
Figure 37:
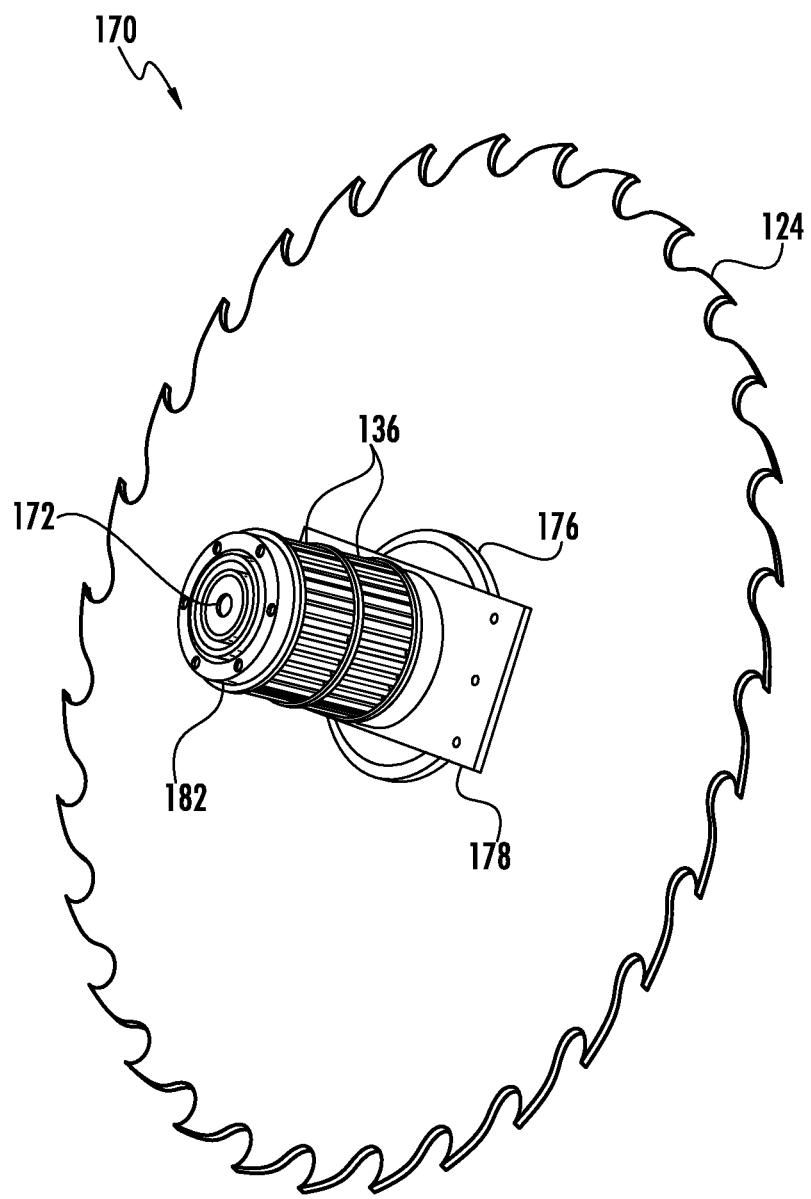
Figure 38:
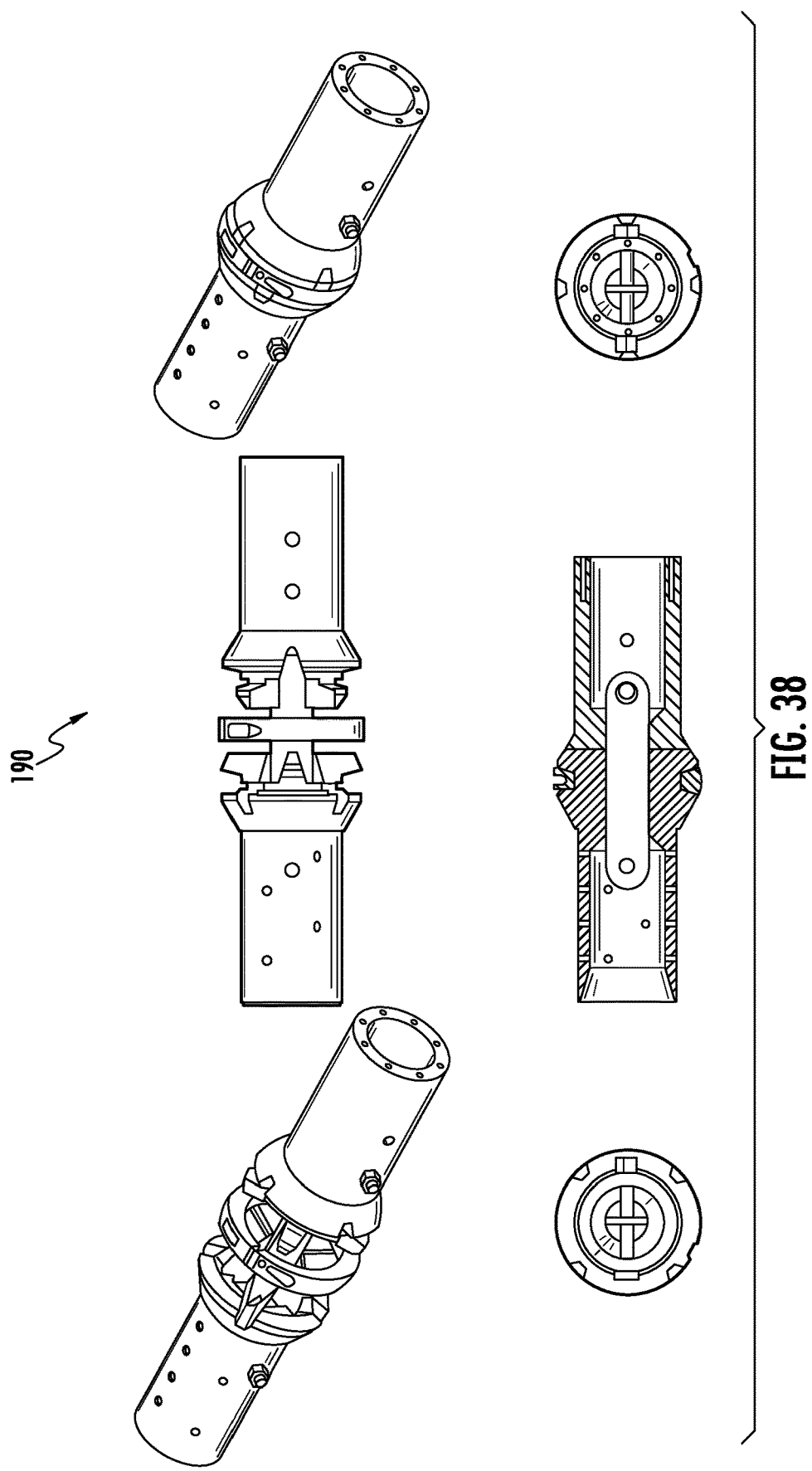
Figure 39:
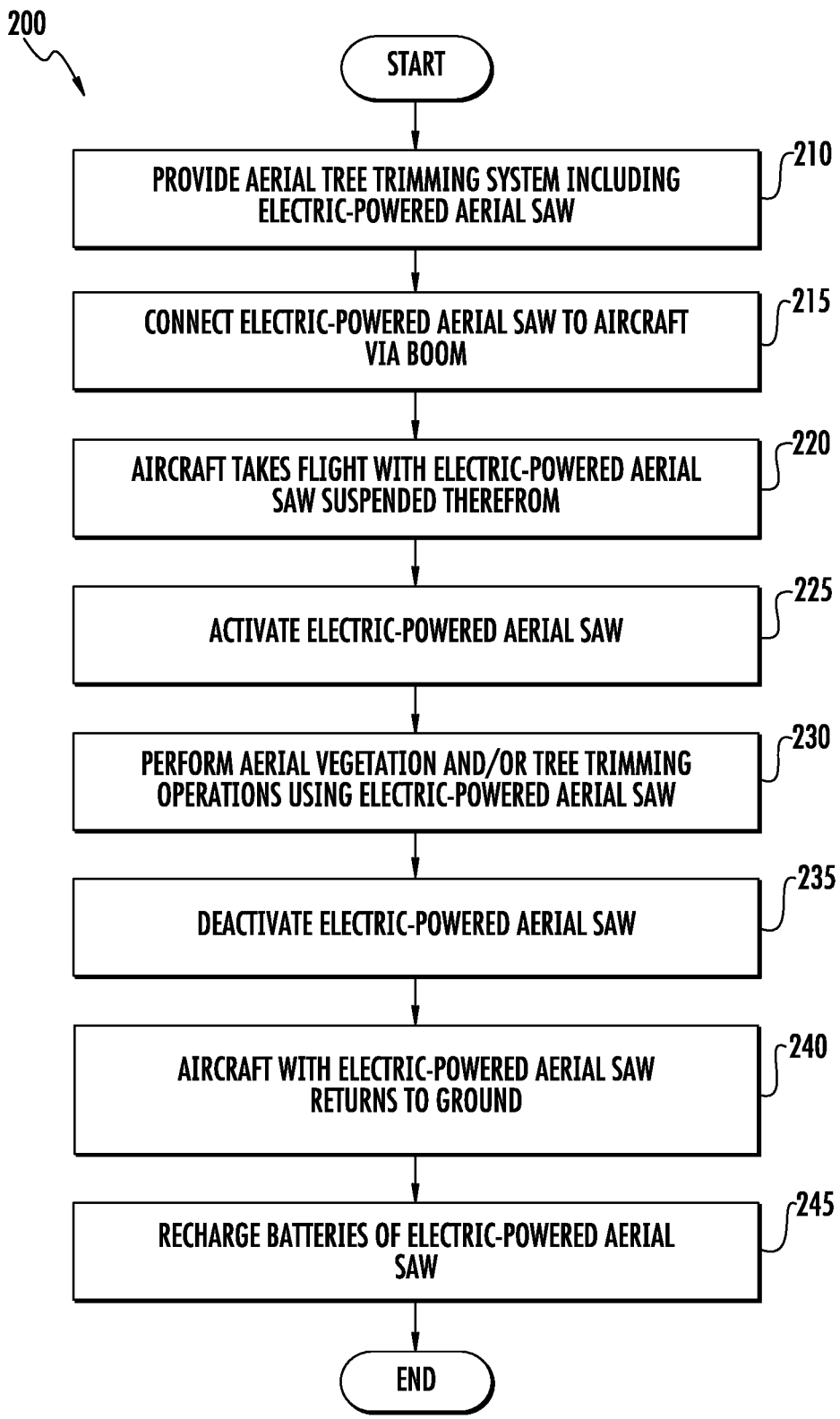
Figure 40A:
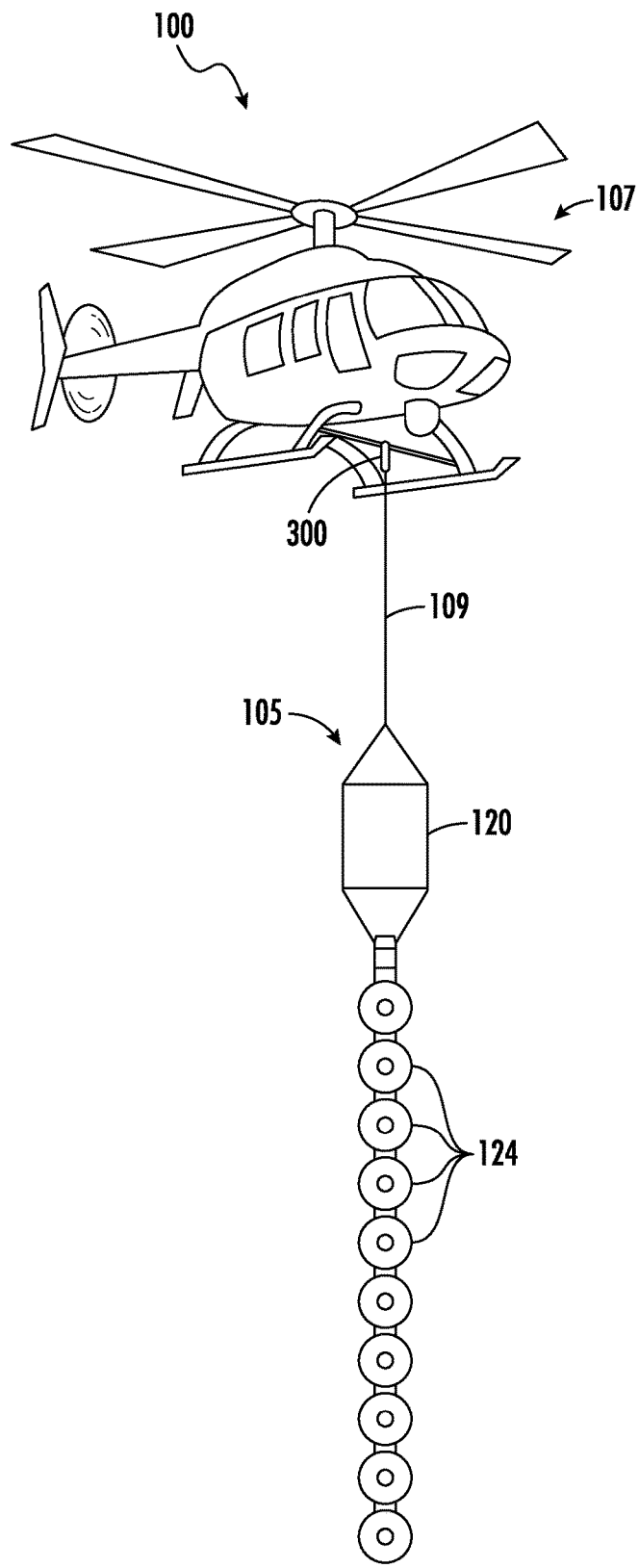
Figure 40B:
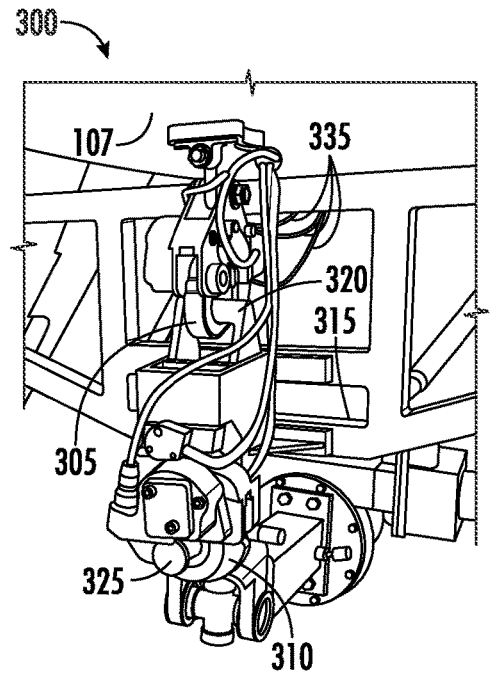
Figure 40C:
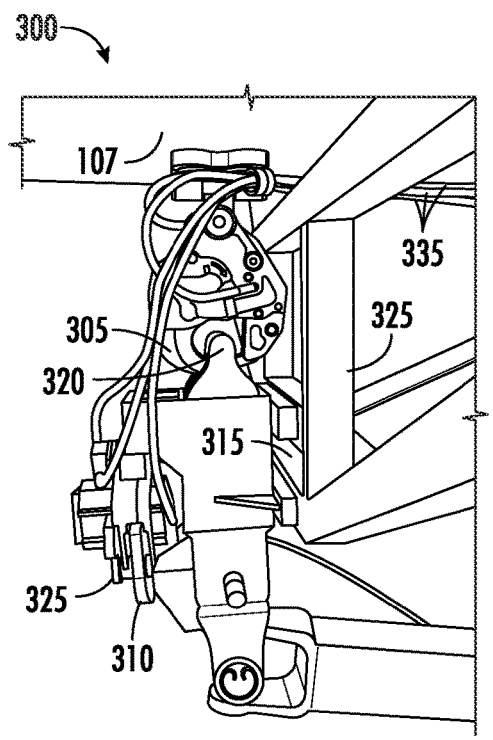

Having thus described the presently disclosed subject matter in general terms, reference will now be made to the accompanying drawings, which are not necessarily drawn to scale, and wherein:

FIG. 1 illustrates a perspective view of an example of the aerial tree trimming system including an electric-powered aerial saw apparatus, in accordance with an embodiment of the invention;

FIG. 2 illustrates a schematic diagram of an example of the electric-powered aerial saw apparatus, in accordance with an embodiment of the invention;

FIG. 3 through FIG. 12 illustrates various views and portions of an example of the electric-powered aerial saw apparatus, in accordance with an embodiment of the invention;

FIG. 13 illustrates various views of an example of an electric motor of the electric-powered aerial saw apparatus, in accordance with an embodiment of the invention;

FIG. 14 illustrates various views of an example of a motor controller module of the electric-powered aerial saw apparatus, in accordance with an embodiment of the invention;

FIG. 15 illustrates various views of an example of a battery assembly of the electric-powered aerial saw apparatus, in accordance with an embodiment of the invention;

FIG. 16 and FIG. 17 illustrate various views of an example of a battery pack of the electric-powered aerial saw apparatus, in accordance with an embodiment of the invention;

FIG. 18 illustrates various views of an example of a battery charger module of the electric-powered aerial saw apparatus, in accordance with an embodiment of the invention;

FIG. 19 and FIG. 20 illustrates example components of an LED light bar system of the electric-powered aerial saw apparatus, in accordance with an embodiment of the invention;

FIG. 21 illustrates an example schematic diagram of an example of the LED light bar system of the electric-powered aerial saw apparatus, in accordance with an embodiment of the invention;

FIG. 22 illustrates an example quick-change adapter-end of the electric-powered aerial saw apparatus, in accordance with an embodiment of the invention;

FIG. 23 through FIG. 29 illustrate various views of an example of a quick-change adapter of the electric-powered aerial saw apparatus, in accordance with an embodiment of the invention;

FIG. 30 illustrates perspective views of an example of a quick-change adapter assembly of the electric-powered aerial saw apparatus, in accordance with an embodiment of the invention FIG. 31 illustrates perspective views of another example of a quick-change adapter assembly of the electric-powered aerial saw apparatus, in accordance with an embodiment of the invention;

FIG. 32 through FIG. 37 illustrate various views of an example of a saw blade assembly of the electric-powered aerial saw apparatus, in accordance with an embodiment of the invention;

FIG. 38 illustrates various views of an example of a saw extension coupling assembly of the electric-powered aerial saw apparatus, in accordance with an embodiment of the invention;

FIG. 39 illustrates a flow diagram of an example of a method of using the aerial tree trimming system including an electric-powered aerial saw apparatus, in accordance with an embodiment of the invention; and FIGS. 40A-C illustrates various views of an example of an emergency release mechanism of the aerial tree trimming system, in accordance with an embodiment of the invention.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides an aerial tree trimming system and method including an electric-powered aerial saw apparatus. For example, an aerial tree trimming system is provided that includes the electric-powered aerial saw suspended (or hanging) from an aircraft (e.g., a helicopter) via a boom or suspension line. Alternatively, the aerial tree trimming system with the electric-powered aerial saw may be suspended or otherwise operatively attached to a boom truck, drone, tractor, or any other suitable vehicle of machinery. The electric-powered aerial saw may include, for example, a motor housing for holding a battery-powered electric motor that is used for driving a plurality of saw blades (i.e., rotatable cutting blades) arranged, for example, in a line along a beam. The presently disclosed aerial tree trimming system may also include an on-site battery charging station.

In some embodiments, the presently disclosed aerial tree trimming system and method including an electric-powered aerial saw apparatus may be used to side trim rights-of-way through vegetation for major power, pipeline, railroad companies, and the like.

In some embodiments, the presently disclosed aerial tree trimming system and method provides an electric-powered aerial saw apparatus that may include a battery-powered electric motor, a motor controller, a radio control device, a battery assembly that may include one or more rechargeable batteries, a battery charger, and a light-emitting diode (LED) light bar system for monitoring and/or visually indicating certain operating parameters and/or health conditions of the electric motor and/or battery assembly.

In some embodiments, the presently disclosed aerial tree trimming system and method provides an electric-powered aerial saw apparatus including a simple design that is absent the complex clutch design required in conventional gasoline-powered aerial saws. Rather, the plurality of saw blades (i.e., rotatable cutting blades) is driven directly by the battery-powered electric motor.

In some embodiments, the presently disclosed aerial tree trimming system and method provides an electric-powered aerial saw apparatus including a bank of onboard batteries and components to transfer power to the working/sawing-end of the device. The design of the electric-powered aerial saw apparatus enables regenerative deceleration to assist in efficiency by charging the battery bank during idle down rotation.

In some embodiments, the presently disclosed aerial tree trimming system and method provides an electric-powered aerial saw apparatus including saw blade assemblies that are designed to absorb the shock loading from the rotational components, wherein each blade will incorporate a slipping type clutch. In the saw blade assemblies, the slipping type clutch allows any rotational component subjected to impact/stoppage to absorb the kinetic energy and allow the remaining components to continue rotation without interruption.

In some embodiments, the presently disclosed aerial tree trimming system and method provides an electric-powered aerial saw apparatus including a quick-change adapter that allows electric-powered aerial saw apparatus to be customizable for specific jobs. For example, the quick-change adapter allows interchangeable cutting heads, such as, but not limited to, a standard cutting head, a re-cut cutting head, a high-altitude cutting head (i.e., light weight cutting head), a topping cutting head, and the like.

In some embodiments, the presently disclosed aerial tree trimming system and method provides an electric-powered aerial saw apparatus including a saw extension coupling assembly or system that provides a quick-connect for connecting or removing boom extensions.

Further, a method of using the presently disclosed aerial tree trimming system including an electric-powered aerial saw apparatus is provided.

Referring now to FIG. 1 is a perspective view of an example of the presently disclosed aerial tree trimming system 100 including an electric-powered aerial saw 105. Aerial tree trimming system 100 may be an airborne tree/vegetation trimming system that includes electric-powered aerial saw 105 suspended (or hanging) from a vehicle, such as a helicopter 107 via a boom 109. Alternatively, the aerial tree trimming system 100 that includes electric-powered aerial saw 105 may be suspended or otherwise operatively attached to another type of vehicle, such as, but not limited to, a boom truck, drone, tractor, or any other suitable vehicle of machinery. Electric-powered aerial saw 105 may include, for example, a motor housing 120 for holding an electric motor 122 (e.g., a battery powered motor, see FIG. 2) that may be used for driving a plurality of saw blades 124 (i.e., rotatable cutting blades) arranged, for example, in a line along a beam. In one example, multiple saw blades 124 may be installed in a line along a beam of electric-powered aerial saw 105. Each saw blade 124 may be, in a non-limiting example, in the range of about a 25-inch to about a 30-inch saw blade. The size of the saw blade 124 may vary depending on use and application. In other embodiments, the saw blade 124 may be smaller than 25-inches or larger than 30-inches. In one non-limiting example, the saw blade may be up to about 60 inches or more, for example for a topping saw (e.g., in tree topping application). Further, the presently disclosed aerial tree trimming system 100 may include a battery charging station 110 for charging the batteries of electric-powered aerial saw 105. Battery charging station 110 may be, for example, an on-site support vehicle equipped with the necessary battery charging equipment.

In the presently disclosed aerial tree trimming system 100, electric-powered aerial saw 105 may be suspended from a flying helicopter 107 to side trim rights-of-way through vegetation for major power, pipeline, railroad companies, and the like. Aerial tree trimming system 100 including electric-powered aerial saw 105 suspended from helicopter 107 may be capable of removing the canopy in rights-of-way by trimming from sky to ground. For example, aerial tree trimming system 100 including an electric-powered aerial saw 105 may be used in the trimming/maintenance of various utility rights-of-way including, but not limited to, power line, gas, railroad, pasture, and orchards.

Referring now to FIGS. 40A-C illustrates various views of an example of an emergency release mechanism 300 of the aerial tree trimming system 100. The aerial tree trimming system 100, may be attached to a vehicle, for example helicopter 107, by an emergency release mechanism 300. An example of an emergency release mechanism 300 may be a two (2) hook emergency release mechanism 300, which may include a first and second release hook 305 and 310, respectively. In one example, the first release hook 305 may be mounted directly to the vehicle chassis, e.g., chassis of helicopter 107, and the second release hook 310 may be mounted directly to a mounting frame structure 315 to which the aerial tree trimming system 100 is mounted to. In such a two (2) hook emergency release mechanism 300, the boom 109 may include a first and second hook attachment points 320 and 325, respectively and a load attachment point. In such an embodiment, both the first release hook 305 and second release hook 310 are engaged with the boom 109, and to release the load, both hooks 305 and 310 would need to be released. For example, the first and second release hooks 305 and 310, respectively may be actuated to release by one or more actuator cables 335, wherein the one or more actuator cables 335 may be operatively connected to one or more actuator levers accessible by the operator, e.g., helicopter pilot.

In one example, the mounting frame structure may include one or more horizontal mounting bars, and may further include one or more upright attachment bars to attach the mounting frame to the vehicle, e.g., helicopter 107. An upper most end of boom 109 may attach to the mounting frame structure via a universal joint, or other suitable mechanism and/or technique.

The battery powered electric motor 122 of aerial tree trimming system 100 provides advantage of not requiring a quantity of combustible fuel to be carried in motor housing 120. Further, the batteries (see FIG. 2, FIG. 12, FIG. 15, FIG. 16, FIG. 17) of electric-powered aerial saw 105 may be rechargeable batteries that may be recharged between uses and/or that may be quickly and easily switched out as needed. More details of an example of electric-powered aerial saw 105 are shown and described hereinbelow with reference to FIG. 2 through FIG. 39.

Referring now to FIG. 2 is a schematic diagram of an example of electric-powered aerial saw 105 of the presently disclosed aerial tree trimming system 100. Electric-powered aerial saw 105 may include, for example, motor housing 120 (which may be capsule shaped) for holding electric motor 122, for example, via a motor mount 123. An extension connector 126 may be provided on the boom 109-end of motor housing 120. A quick-change adapter 128 may be provided on the saw blades 124-end of motor housing 120.

Motor housing 120 has an overall length L, an overall width W, and an overall height H. The overall length L of motor housing 120 may be, in a non-limiting example, in the range of about 12 inches to about 120 inches. The overall width W of motor housing 120 may be, in a non-limiting example, in the range of about 12 inches to about 48 inches. The overall height H of motor housing 120 may be, in a non-limiting example, in the range of about 12 inches to about 48 inches. In other embodiments, length L, width W, and/or height H of motor housing 120 may be smaller or larger than the ranges stated above.

Quick-change adapter 128 supports a beam 130 along which the plurality of saw blades 124 are installed. Further, quick-change adapter 128 may be mechanically coupled to motor housing 120 via certain adapter attachment points 132. In aerial tree trimming system 100, quick-change adapter 128 allows electric-powered aerial saw 105 to be customizable for specific jobs. For example, quick-change adapter 128 allows interchangeable cutting heads (not shown), such as, but not limited to, a standard cutting head, a re-cut cutting head, a high-altitude cutting head (i.e., light weight cutting head), a topping cutting head, and/or other type cutting heads.

Beam 130 may be, for example, a length of tubing (e.g., hollow tubing with rectangular cross-section). In one non-limiting example, the cross-section of beam 130 may be in the range of about 1 inch by about 1 inch to about 12 inches by about 12 inches. In other embodiments, the cross-section of beam 130 may be smaller than 1 inch by 1 inch or larger than 12 inches by 12 inches, or further still the cross-section of beam 130 may have differing length and width cross-section values. In one non-limiting example, beam 130 may be in the range of about 12 inches to about 480 inches long, and designed to hold in one non-limiting example in the range of about 1 to about 30 saw blades 124, and may be orientated in a line or other suitable orientation. Further, saw blades 124 may be vertically or horizontally orientated, or any orientation in-between. In other embodiments, the length of beam 130 may be smaller than 12 inches or larger than 480 inches, and designed to hold in greater than 30 saw blades 124. Beam 130 may be formed, for example, of aluminum, steel, stainless steel, PVC plastic, or any other suitable material.

Electric motor 122 may be arranged in motor housing 120 with respect to quick-change adapter 128, beam 130, and saw blades 124. For example, electric motor 122 may include a pulley 134 and each of the saw blades 124 may include a saw belt pulley 136. Electric motor 122 may drive the plurality of saw blades 124 via a drive belt 138. Further, while FIG. 2 shows one saw blade 124 only, it is understood that multiple saw blades 124 are installed along beam 130 of electric-powered aerial saw 105.

Additionally, electric-powered aerial saw 105 may include a motor controller 140 for controlling electric motor 122, a radio control 142 that provides a wireless communications link in electric-powered aerial saw 105, a battery assembly 144 that may include one or more rechargeable batteries, and a status indicator, such as light-emitting diode (LED) light bar system 148. LED light bar system 148 may be used to provide a visual indicator (i.e., visible from helicopter 107) of certain operating parameters and/or health conditions of electric motor 122 and/or battery assembly 144 of electric-powered aerial saw 105. The electric-powered aerial saw 105 may further include a battery charger module 146 for charging the batteries of battery assembly 144.

Referring now to FIG. 3 through FIG. 12 shows photos of various views and portions of an example of electric-powered aerial saw 105 of the presently disclosed aerial tree trimming system 100. FIG. 3 through FIG. 12 show that motor housing 120 may be a plurality of frame members 150 arranged, for example, in a capsule shape that may be tapered at both ends. Further, certain solid or grated panels 152 may be installed on frame members 150. In one example, grated panels 152 are provided in areas of electric-powered aerial saw 105 that may require airflow for cooling. For example, grated panels 152 may be provided near electric motor 122. Additionally, grated panels 152 may be provided in a manner that allows LED light bar system 148 to be visible from vehicle 107. In one example, electric motor 122 may be mounted to one or more of the frame members 150 via motor mount 123.

Figure 3:
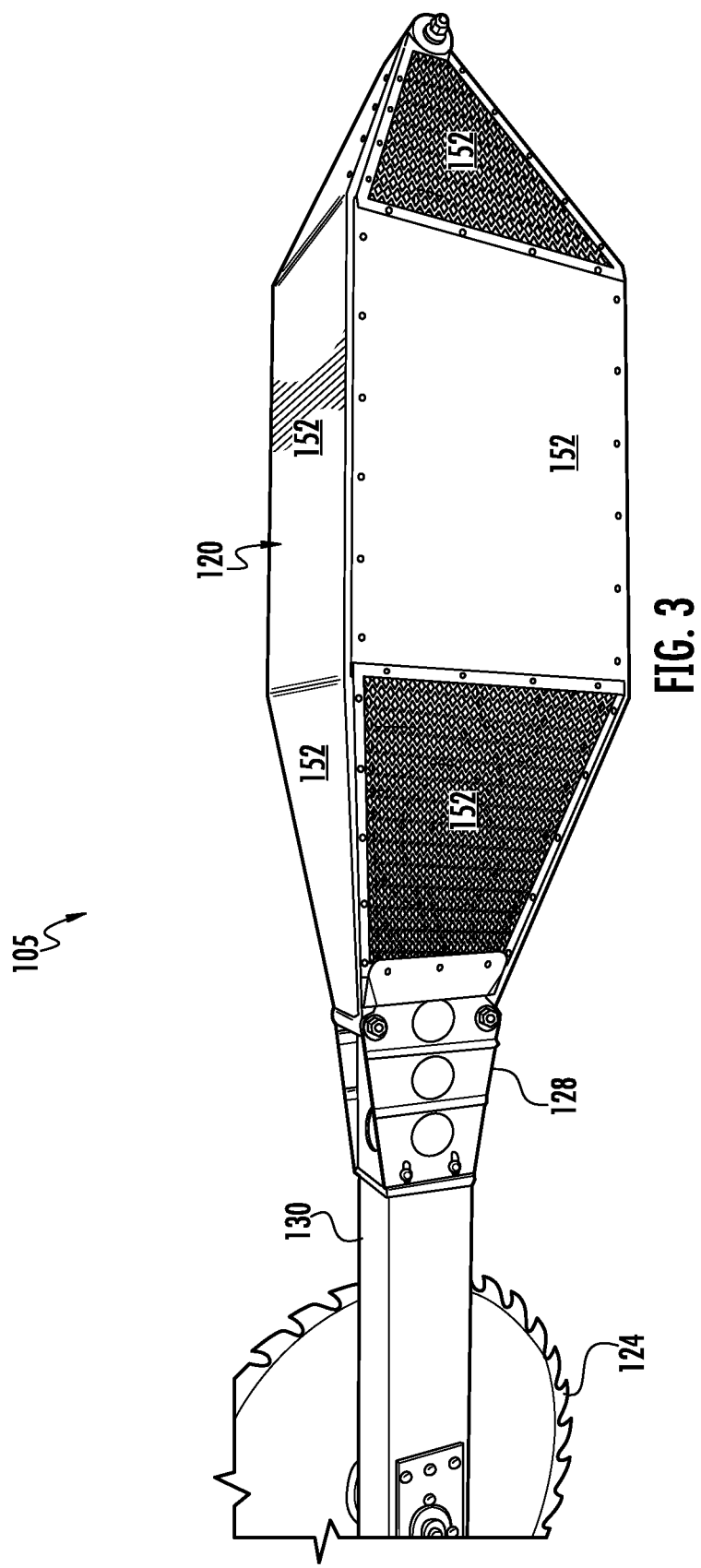
Figure 4:
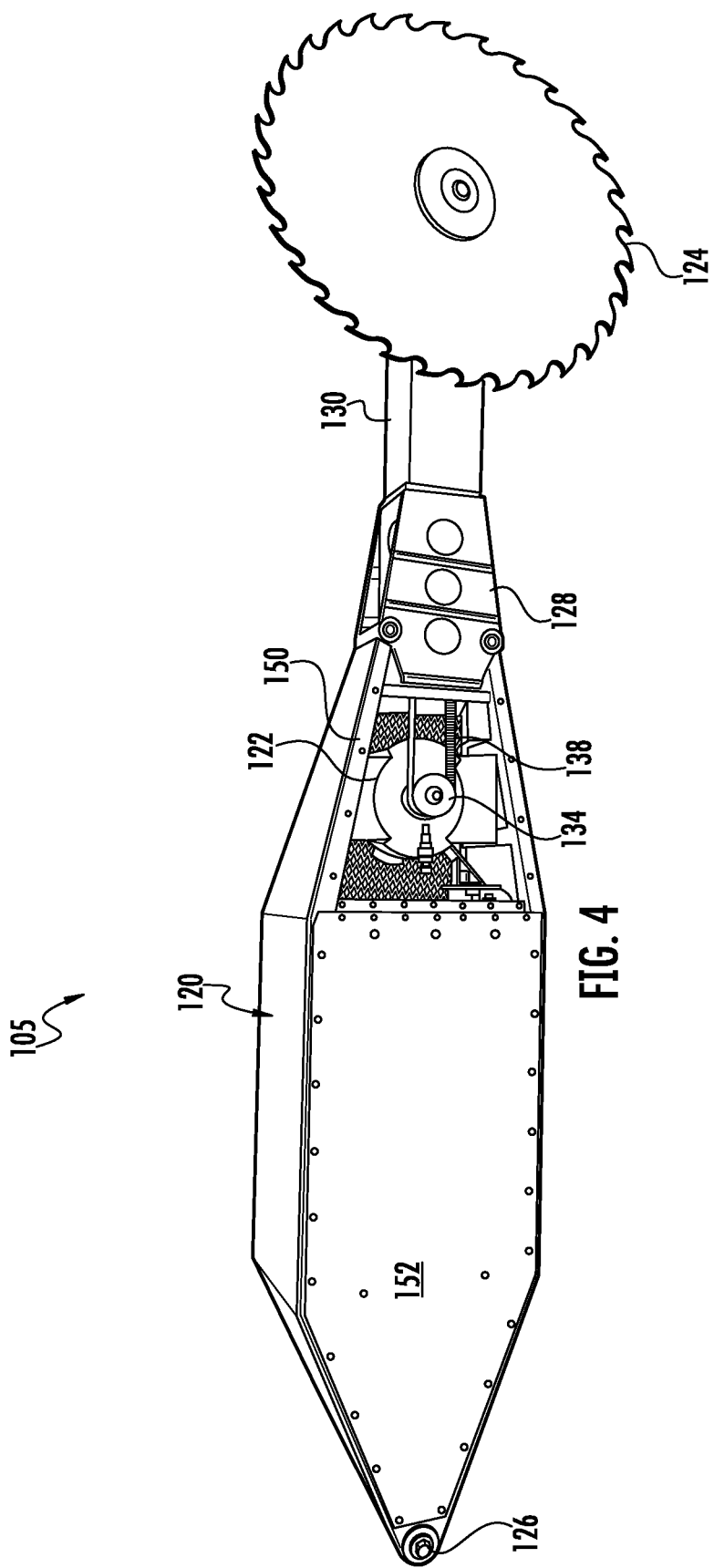
Figure 5:
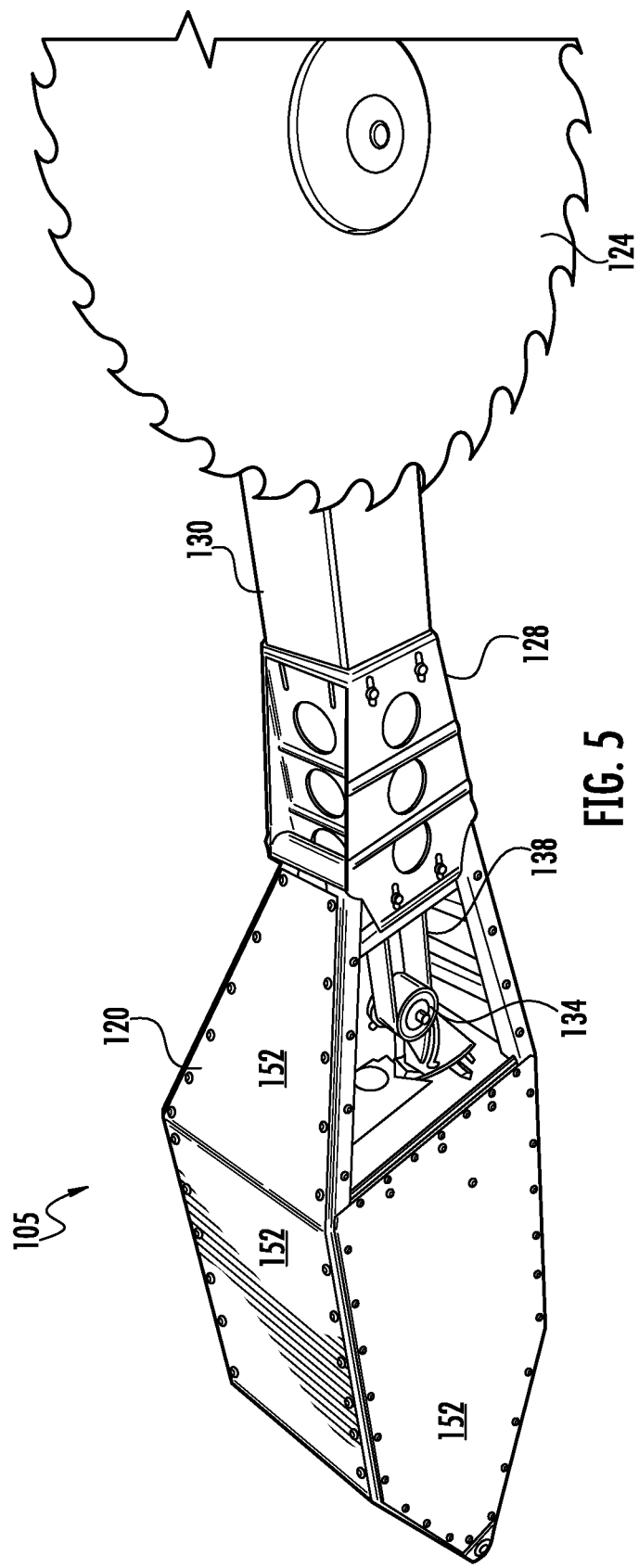
Figure 6:
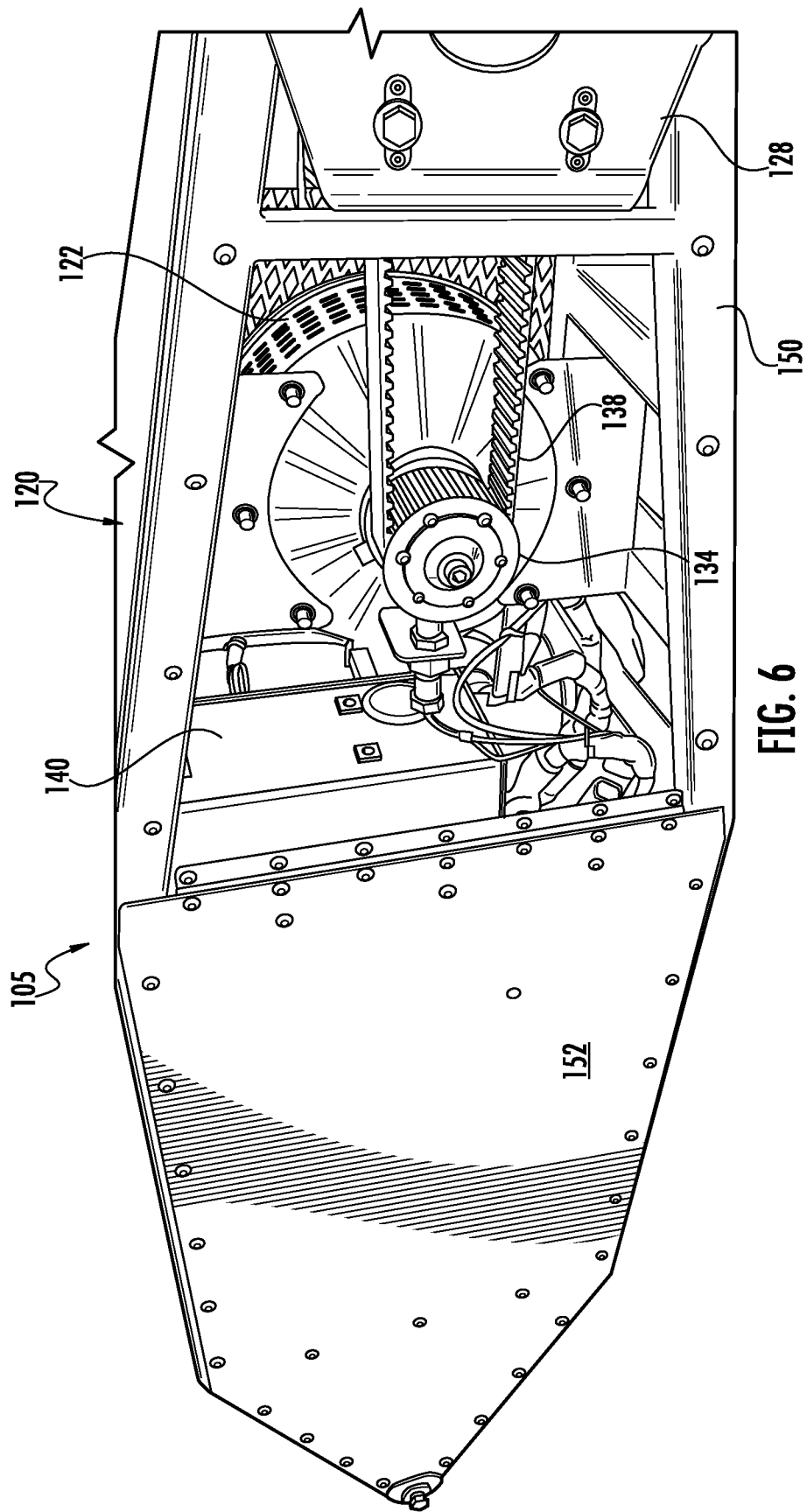
Figure 7:
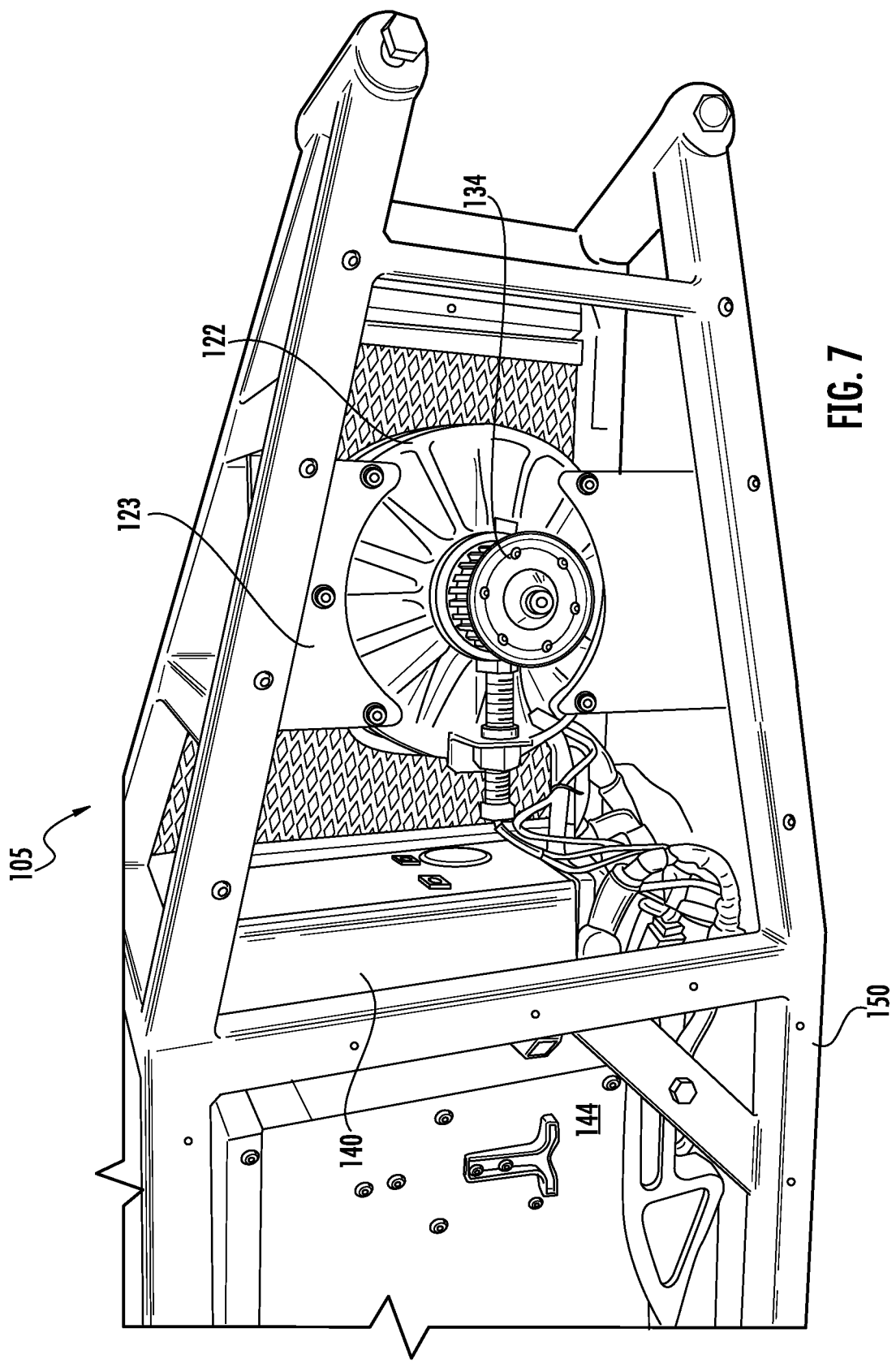
Figure 8:
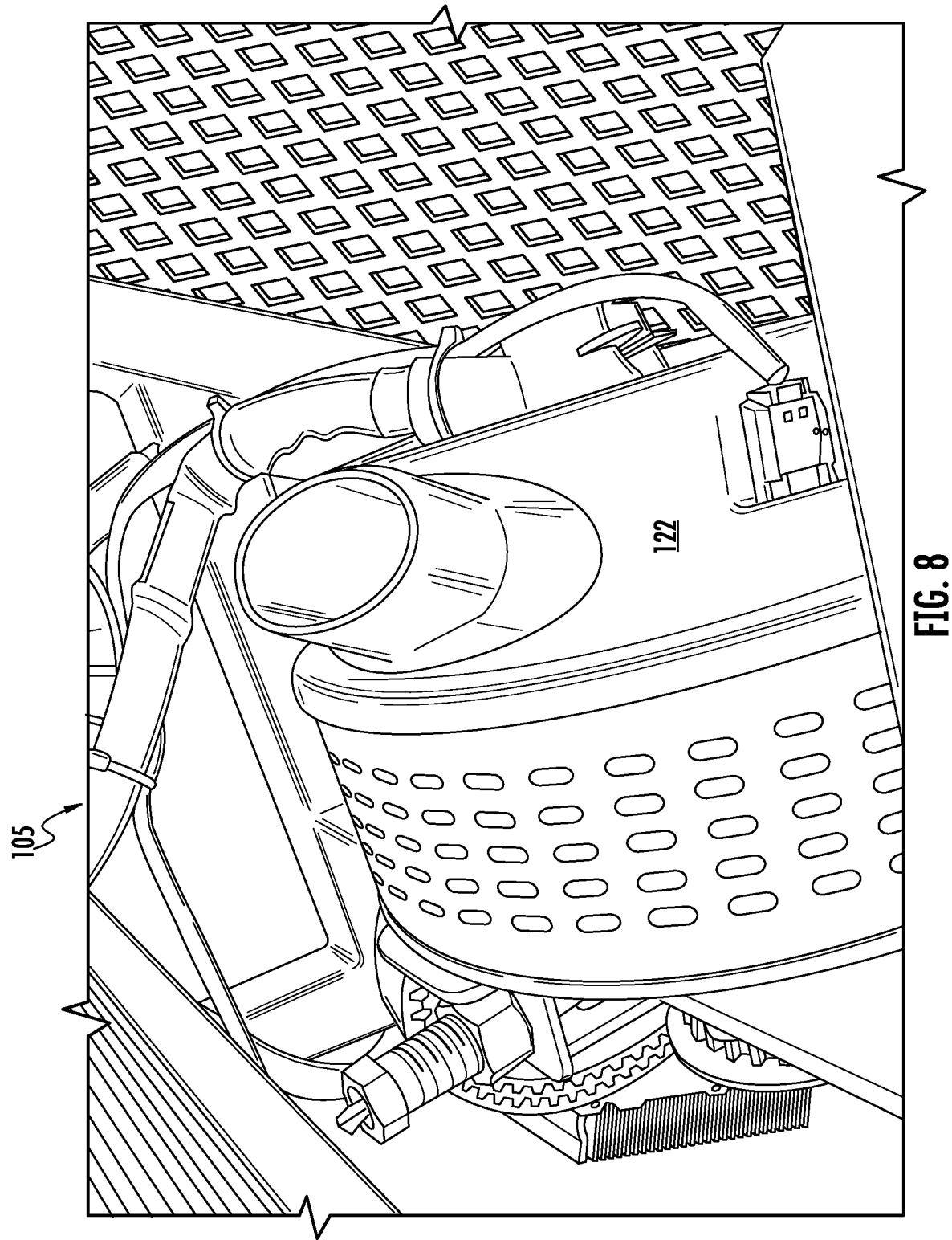
Figure 9:
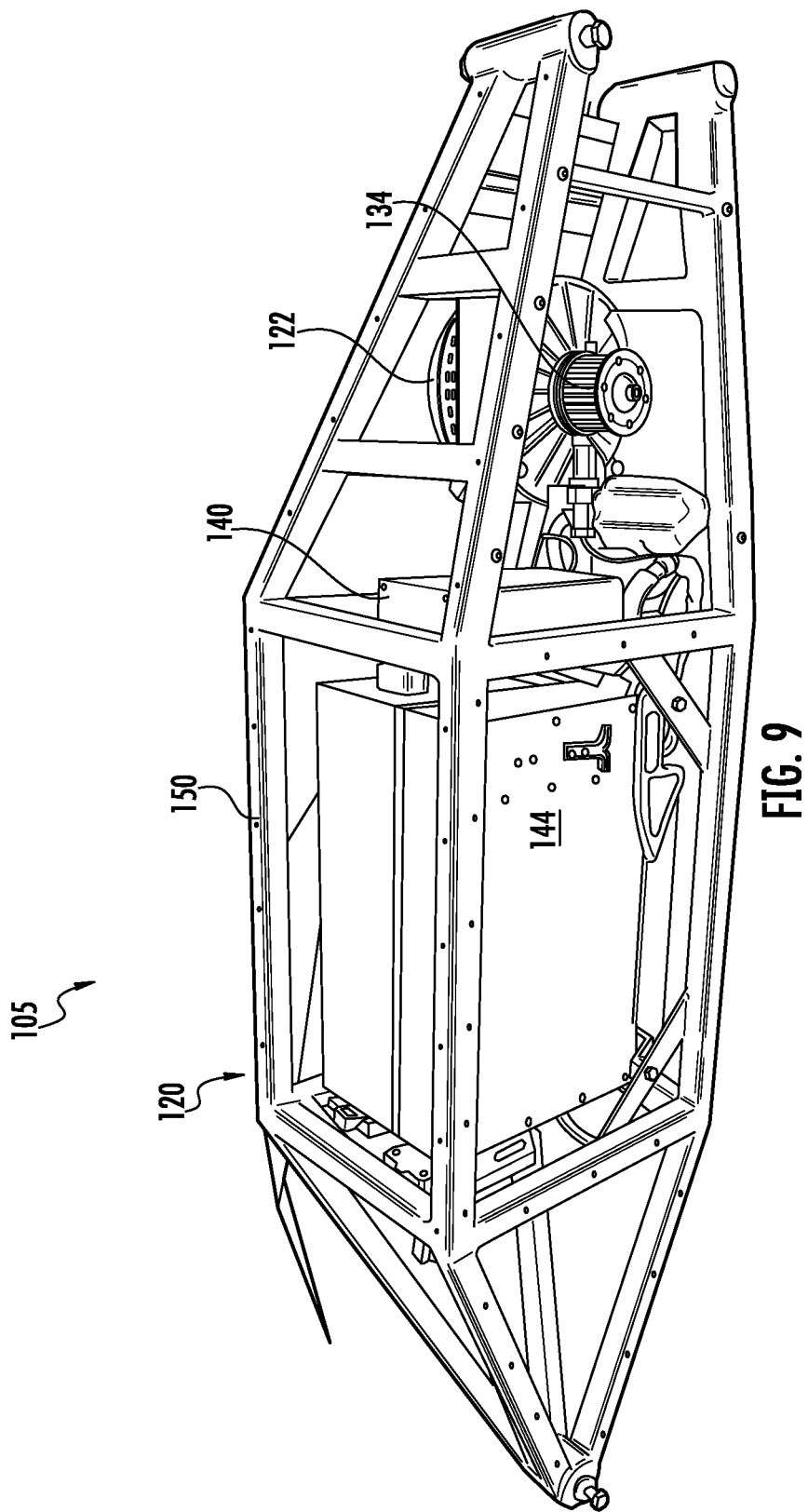
Figure 10:
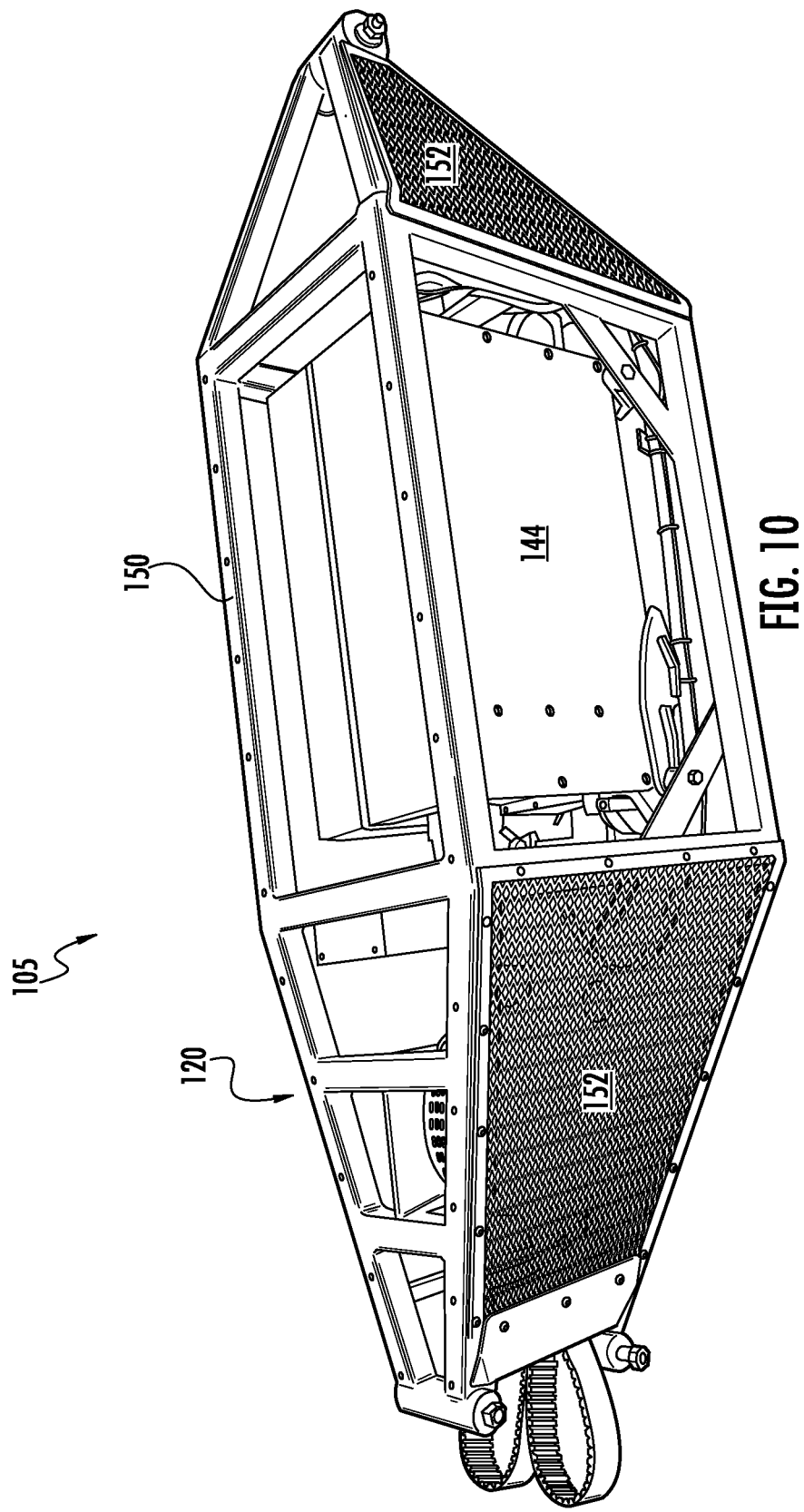
Figure 11:
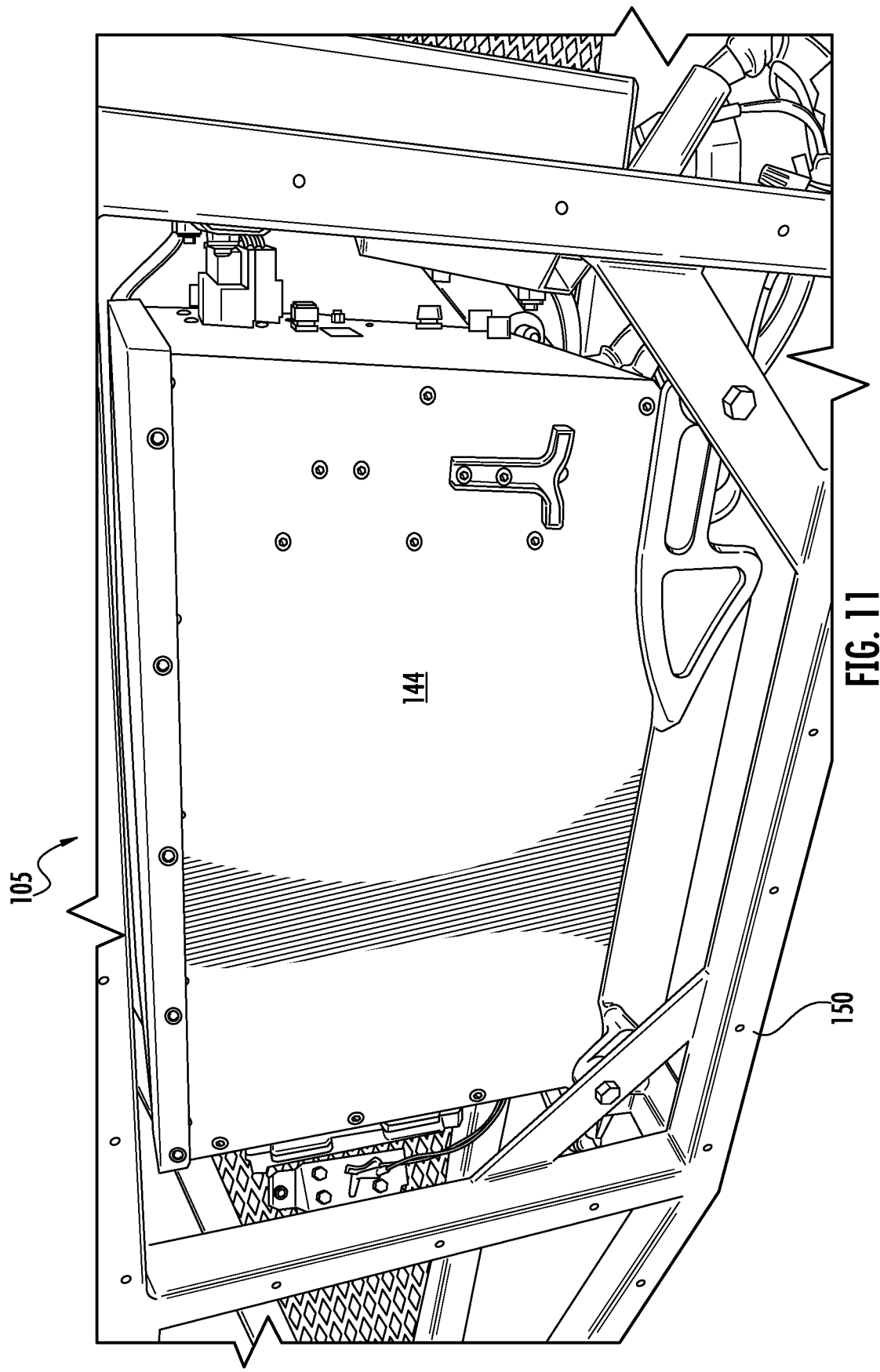

FIG. 3 shows an example of electric-powered aerial saw 105 with substantially all the solid and grated panels 152 installed. FIG. 4 through FIG. 9 show electric-powered aerial saw 105 absent certain solid and/or grated panels 152 such that details of electric motor 122 and/or motor controller 140 are visible. Further, FIG. 8 shows a closeup of electric motor 122. In aerial tree trimming system 100, electric-powered aerial saw 105 includes a simple design that may be absent the complex clutch design required in conventional gasoline-powered aerial saws. Rather, the plurality of saw blades 124 (i.e., rotatable cutting blades) is driven directly by the battery-powered electric motor 122.

Figure 12:
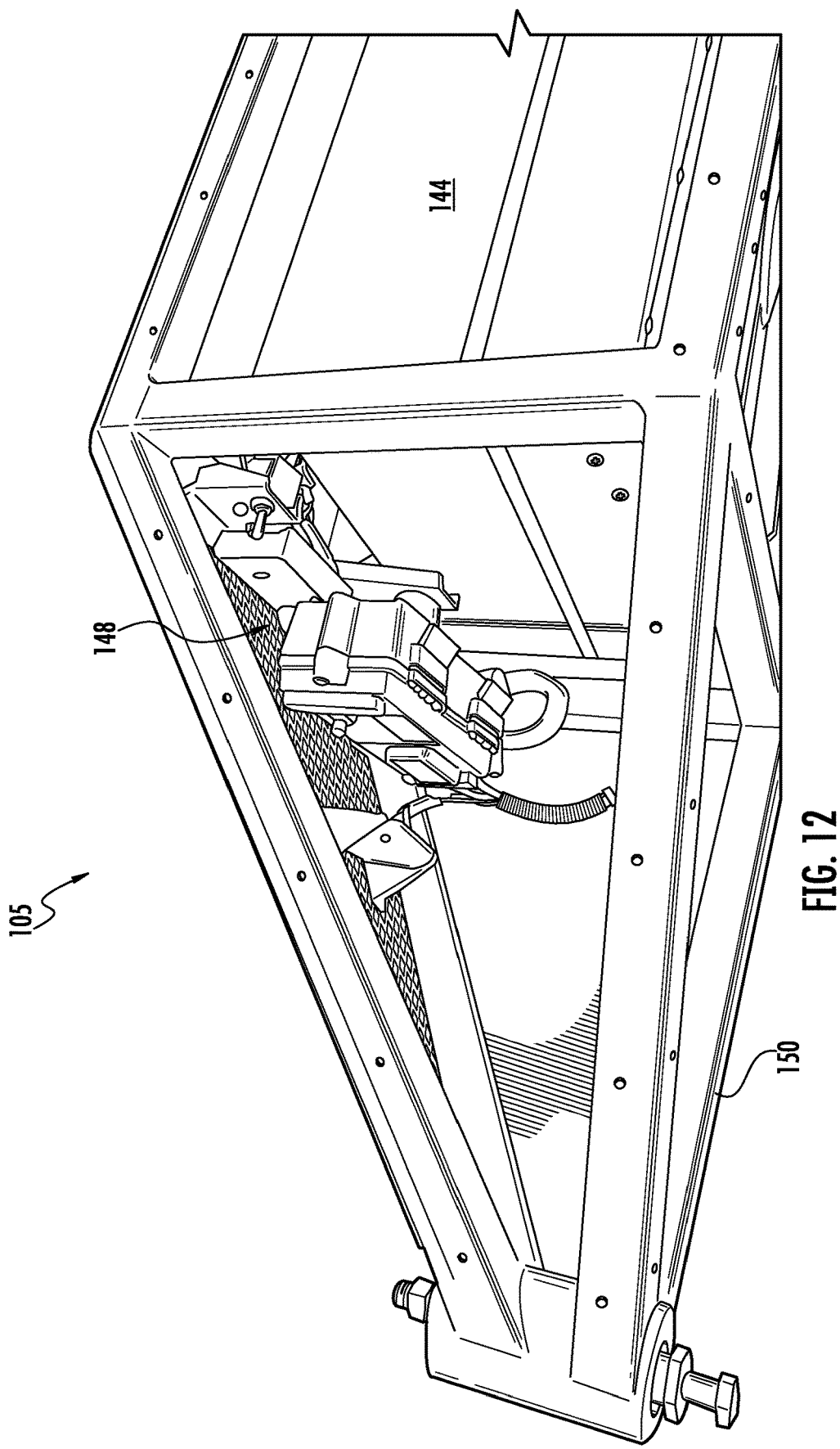

FIG. 9 through FIG. 12 show electric-powered aerial saw 105 absent certain solid and/or grated panels 152 such that details of battery assembly 144 are visible. Additionally, FIG. 12 shows more details of LED light bar system 148.

Frame members 150 forming motor housing 120 of electric-powered aerial saw 105 may be, for example, square tubing (i.e., hollow tubing with square cross-section), rectangular tubing (i.e., hollow tubing with rectangular cross-section), piping (i.e., hollow piping with circular cross-section), I-beams, structural channels, angle members, and any combinations thereof. Frame members 150 may preferably be formed of steel, or any other suitable material, including but not limited to aluminum, stainless steel, PVC plastic, and/or any combinations thereof. The various frame members 150 forming electric-powered aerial saw 105 may have the same or different cross-sectional dimensions and the same or different cross-sectional shapes, and may comprise the same or different gauge metal.

In one example, electric-powered aerial saw 105 is formed entirely of steel or aluminum square tubing, wherein the steel or aluminum members are mechanically coupled via, for example, welding. In one example, certain frame members 150 may be 2×2-inch square tubing while other frame members 150 may be 1×1-inch square tubing. Referring now again to FIG. 1 through FIG. 12, more details of examples of electric motor 122, motor controller 140, radio control 142, battery assembly 144, battery charger 146, and LED light bar system 148 are provided as follows.

In one non-limiting example, electric motor 122 of electric-powered aerial saw 105 may be the Z-Force® type motor available from ZERO Motorcycles (Scotts Valley, CA). For example, the ZF75-5 IPM MOTOR—3 phase AC, passively air cooled, high efficiency radial flux, interior permanent magnet brushless motor, peak torque of 78 ft-lb (106 Nm), peak power of 46 hp (34 kW) @ 4,300 rpm. However, any other suitable electric motor may be used, and the above is just one possible non-limiting example of electric motor 122. In electric-powered aerial saw 105, the motor connections may utilize plug type connections to facilitate efficient replacement of electric motor 122 for maintenance/repair purposes. FIG. 13 shows various views of an example of electric motor 122 of electric-powered aerial saw 105 of the presently disclosed aerial tree trimming system 100.

In one non-limiting example, motor controller 140 of electric-powered aerial saw 105 may be a motor controller available from SEVCON® (Southborough, MA). For example, the GEN 4 SEVCON motor controller—High efficiency, 0 to 550 amp, 3 phase brushless motor controller with regenerative deceleration. However, any other suitable motor controller may be used, and the above is just one possible non-limiting example of motor controller 140. In electric-powered aerial saw 105, the motor controller connections may utilize plug type connections to facilitate efficient replacement of motor controller 140 for maintenance/repair purposes. FIG. 14 shows various views of an example of motor controller 140 of electric-powered aerial saw 105 of the presently disclosed aerial tree trimming system 100.

Radio control 142 of electric-powered aerial saw 105 may be a radio transmitter that provides a wireless communications link in electric-powered aerial saw 105. For example, using radio control 142, the saw main power and modes of operation may be controlled. Radio control 142 may be utilized at the pilot/operator controls to command saw operation. Radio control 142 will receive the radio inputs and energize/deenergize related circuitry to respond to pilot/operator requirements. These commands may include, but are not limited to, main power on/off, engage motor/blades, disengage motor/blades, soft start motor/blades, throttle control, intelligent load sense mode, and/or emergency stop.

Battery assembly 144 of electric-powered aerial saw 105 may include one or more rechargeable batteries. Battery assembly 144 may be, in one-non-limiting example, the Z-Force® modular battery available from ZERO Motorcycles (Scotts Valley, CA). For example, Z-Force® modular battery 16MY IMPL—Lithium Ion, intelligent integrated battery, 0-200 VDC, 7.2-14.4 KWH capacity, charge rate range 0 to 12 KW. However, any other suitable battery/battery assembly may be used, and the above is just one possible non-limiting example of battery assembly 144. In electric-powered aerial saw 105, the battery connections may utilize plug type connections to facilitate efficient replacement of battery/batteries. FIG. 15 shows various views of an example of battery assembly 144 of electric-powered aerial saw 105 of the presently disclosed aerial tree trimming system 100.

Further, battery assembly 144 may be, for example, quick change batteries of different sizes that may allow customization of battery size to match the project. For example, FIG. 16 and FIG. 17 are various views of a battery pack 154 that may be another example of battery assembly 144. Battery pack 154 may be the Z-Force® battery pack available from ZERO Motorcycles (Scotts Valley, CA), such as the LONGBRICK 17MY IMPL battery pack. However, any other suitable battery pack may be used, and the above is just one possible non-limiting example of battery pack 154.

In one example, battery charger 146 of electric-powered aerial saw 105 may be a standard battery charger module for charging battery assembly 144 when electric-powered aerial saw 105 is not in use. For example, battery charger 146 may be plugged into a power source, such as a standard AC or DC source for a period of time when electric-powered aerial saw 105 is not in use. In one non-limiting example, battery charger 146 may be the CALEX CHARGER ASSEMBLY 720W available from Calex Mfg. Co., Inc. (Concord, CA) that is shown in FIG. 18. However, any other suitable battery charger may be used, and the above is just one possible non-limiting example of battery charger 146.

In electric-powered aerial saw 105, charging of the battery bank (e.g., battery assembly 144) may be, in one example, facilitated in the field by support vehicles equipped with necessary equipment (e.g., battery charging station 110). Battery assembly 144 may be a quick-change design thus allowing for rapid battery replacement/swap in and out of the saw. The depleted battery bank may be charged by support vehicle (e.g., battery charging station 110) while the saw is in operation with a replacement battery bank. Further, the use of specific programming parameters in electric-powered aerial saw 105 may be utilized to maximize efficiency. These programming parameters may include, but are not limited to, commanding the saw rpm to increase from idle state when load is detected on the working end of the saw and decrease rpm when no load detected, automatic shutdown of the electric motor if undesirable parameters are met (e.g., low battery conditions or potentially damaging component temperature or torque), and soft start of motor at initial engagement to prolong battery life. Further, the design of electric-powered aerial saw 105 enables regenerative deceleration to assist in efficiency by charging the battery bank (e.g., battery assembly 144) during idle down rotation.

In another example, aerial tree trimming system 100 may include an onboard and in-flight battery charging mechanism (not shown). For example, aerial tree trimming system 100 may include an induction coil type device to wirelessly transfer power from the electromagnetic field generated by nearby power transmission lines to a saw/aircraft mounted induction coil. This battery charging device would aid in maintaining battery life while in flight in the power transmission line right of way. For example, the onboard and in-flight battery charging mechanism (not shown) may be attached to motor housing 120 of electric-powered aerial saw 105 and/or to the suspension system connecting suspension line 109 to helicopter 107. In this example, power may be absorbed by an inductance coil. The power would then be routed to, for example, motor controller 140 (or any other control circuitry) and used to charge/maintain the voltage of battery assembly 144.

Engine/battery parameters may be monitored remotely by sight utilizing light emitting diodes mounted to body of saw. For example, LED light bar system 148 of electric-powered aerial saw 105 may be used to provide a visual indicator (i.e., visible from helicopter 107) of certain parameters and/or health conditions of electric motor 122 and/or battery assembly 144 of electric-powered aerial saw 105. Parameters to be monitored may include, but are not limited to, RPM, motor/battery/controller temperature warnings, radio system status, armed state, and system failure. For example, the RPM and motor temperature parameter data may be provided by a linear encoder and thermocouple integral to electric motor 122. Motor controller temperature data will be provided by thermocouple integral to motor controller 140. Battery status and temperature data will be provided by battery monitoring circuit and uses multiple thermocouples.

The components forming LED light bar system 148 may utilize plug type connections to facilitate efficient replacement thereof. FIG. 19 and FIG. 20 shows photos of example components of LED light bar system 148 of electric-powered aerial saw 105 of the presently disclosed aerial tree trimming system 100. In one example, LED light bar system 148 may include an LED light bar 160, a light bar module 162, and a light bar battery 164. Further, FIG. 21 is a schematic diagram of an example of LED light bar system 148 in electric-powered aerial saw 105.

Referring now to FIG. 22 shows a photo of the quick-change adapter 128-end of electric-powered aerial saw 105 of the presently disclosed aerial tree trimming system 100. Additionally, FIG. 23 through FIG. 29 show various views of an example of quick-change adapter 128. Quick-change adapter 128 is used to secure the beam 130 that is holding the saw blades 124 to motor housing 120 that is holding the motor/battery portion of electric-powered aerial saw 105. Again, quick-change adapter 128 allows electric-powered aerial saw 105 to be customizable for specific jobs. For example, quick-change adapter 128 allows interchangeable cutting heads (not shown), such as, but not limited to, a standard cutting head, a re-cut cutting head, a high-altitude cutting head (i.e., light weight cutting head), a topping cutting head, and/or other type cutting head.

Quick-change adapter 128 allows for secure attachment of the rotating blade assembly while at the same time allowing quick detachment of beam 130 for maintenance or replacement. Quick-change adapter 128 may be fabricated from, for example, heat treated carbon steel or any other suitable material. For example, quick-change adapter 128 may utilize a plurality of nut plates (e.g. 8) paired with aircraft grade (or other suitable material) fasteners (e.g., 8) for attachment to beam 130.

At the two adapter attachment points 132, quick-change adapter 128 uses high grade bolts and nuts that may seat in tapered bores to make connection to the frame members 150 of motor housing 120. By way of example, FIG. 30 shows perspective views of an example of a quick-change adapter assembly 166 of electric-powered aerial saw 105 of the presently disclosed aerial tree trimming system 100. FIG. 30 shows an example of quick-change adapter 128 mechanically connect to frame members 150 of motor housing 120 using bolts at the two adapter attachment points 132.

Quick-change adapter 128 provides a quick attach "box" style, sliding connection of motor housing 120 to beam 130 holding the saw blades 124. The quick-change adapter 128 design (1) allows for secure attachment of beam 130 holding the saw blades 124, and (2) allows tightening/loosening of the main drive belt 138.

Referring now to FIG. 31 is perspective views of another example of a quick-change adapter assembly 166 of electric-powered aerial saw 105 of the presently disclosed aerial tree trimming system 100.

Referring now to FIG. 32 through FIG. 37 is various views of an example of a saw blade assembly 170 of electric-powered aerial saw 105 of the presently disclosed aerial tree trimming system 100. There may be one saw blade assembly 170 for each of the rotatable saw blades 124 installed in electric-powered aerial saw 105. Saw blade assembly 170 may include, for example, saw blade 124 mounted on a saw pulley shaft 172. Saw blade 124 may be, for example, a 25-inch to 30-inch saw blade. Saw blade 124 may be held on saw pulley shaft 172 via a saw blade retainer plate 174 on the outside of saw blade 124 and a saw blade drive plate 176 on the inside of saw blade 124. Following the saw blade drive plate 176 on the inside of saw blade 124 may be a saw bearing slide plate 178, an inner bearing 180, an inner saw belt pulley 136, an outer saw belt pulley 136, and an outer bearing 182. Each of the saw belt pulleys 136 has an arrangement of pulley belt sprockets for engaging with corresponding pulley belt sprockets on drive belt 138.

When saw blade assembly 170 is installed along beam 130, saw blade 124 is outside of beam 130, while saw bearing slide plate 178, inner bearing 180, inner saw belt pulley 136, outer saw belt pulley 136, and outer bearing 182 sit inside the hollow portion of beam 130. Further, drive belt 138 runs inside the hollow portion of beam 130 to the first saw blade assembly 170 in the line.

Each saw blade assembly 170 of electric-powered aerial saw 105 may be configured to absorb the shock loading from the rotational components, wherein each saw blade 124 may incorporate a slipping type clutch (e.g., saw bearing slide plate 178). The slipping type clutch allows any rotational component subjected to impact/stoppage to absorb the kinetic energy and allow the remaining components to continue rotation without interruption.

Referring now to FIG. 38 is various views of an example of a saw extension coupling assembly 190 of electric-powered aerial saw 105 of the presently disclosed aerial tree trimming system 100. Saw extension coupling assembly 190 provides the coupling mechanism that can join extension pieces of boom 109 together, which allows the overall length of boom 109 to be changed quickly. Saw extension coupling assembly 190 may include quick-attach couplings that rely on tapered lugs and a tapered compression band for a secure connection. For example, saw extension coupling assembly 190 may be, for example, a four-lobed tapered connection that, when mated with an opposing four-lobed tapered connection and compressed with a tapered constricting ring, provides a secure connection between extension pieces of boom 109. These connections are quickly attached/detached from one another. These connections are interchangeable/variable in position end-to-end and rotationally.

The design of saw extension coupling assembly 190 eliminates rotational, horizontal, and vertical unwanted movement of the connection thus eliminating wear and damage of the connections. The design of saw extension coupling assembly 190 enables quick assembly/disassembly of the connections and ensures proper assembly of the connections.

Referring now to FIG. 39 is a flow diagram of an example of a method 200 of using the presently disclosed aerial tree trimming system 100 including electric-powered aerial saw 105. Method 200 may include, but is not limited to, the following steps.

At a step 210, the presently disclosed aerial tree trimming system 100 is provided that includes, for example, electric-powered aerial saw 105 connected to helicopter 107 via suspension line 109, and battery charging station 110. For example, aerial tree trimming system 100 as described hereinabove with reference to FIG. 1 through FIG. 38 is provided.

At a step 215, electric-powered aerial saw 105 is connected to the aircraft (e.g., helicopter 107) via boom 109. For example, a fully charged electric-powered aerial saw 105 may be connected to the far end of boom 109.

At a step 220, the aircraft (e.g., helicopter 107) takes flight with the fully charged electric-powered aerial saw 105 suspended therefrom.

At a step 225, electric-powered aerial saw 105 is activated. For example, electric-powered aerial saw 105 may be activated remotely from the aircraft (e.g., helicopter 107) using, for example, the wireless communication link facilitated by radio control 142 of electric-powered aerial saw 105. Accordingly, using radio control 142, electric motor 122 and therefore saw blade assemblies 170 including the rotatable saw blades 124 are activated.

At a step 230, aerial vegetation and/or tree trimming operations are performing using electric-powered aerial saw 105 with the saw blade assemblies 170 and rotatable saw blades 124. During cutting operations, electric-powered aerial saw 105 may be controlled remotely from the aircraft (e.g., helicopter 107) using, for example, the wireless communication link facilitated by radio control 142 of electric-powered aerial saw 105.

At a step 235, electric-powered aerial saw 105 may be deactivated. For example, electric-powered aerial saw 105 may be deactivated, for example, remotely from the aircraft (e.g., helicopter 107) using the wireless communication link facilitated by radio control 142 of electric-powered aerial saw 105.

At a step 240, the aircraft (e.g., helicopter 107) with electric-powered aerial saw 105 returns to ground. Then, electric-powered aerial saw 105 may be disconnected from the aircraft (e.g., helicopter 107). Alternatively, just the depleted batteries may be disconnected and removed from the electric-powered aerial saw 105

At a step 245, the batteries of electric-powered aerial saw 105 are recharged. For example, at battery charging station 110 of aerial tree trimming system 100, battery charger 146 of electric-powered aerial saw 105 may be plugged into a power source, such as a standard AC or DC source for a period of time. In so doing, any rechargeable batteries of battery assembly 144 of electric-powered aerial saw 105 are recharged.

In summary and referring now again to FIG. 1 through FIG. 39, aerial tree trimming system 100 is provided that includes electric-powered aerial saw 105 suspended (or hanging) from helicopter 107 via boom 109. The presently disclosed aerial tree trimming system 100 may also include on-site battery charging station 110. The presently disclosed aerial tree trimming system 100 and method 200 that includes electric-powered aerial saw 105 may be used, for example, to side trim rights-of-way through vegetation for major power, pipeline, railroad companies, and the like.

Further, electric-powered aerial saw 105 includes a simple design that is absent the complex clutch design required in conventional gasoline-powered aerial saws. Rather, the plurality of saw blades 124 (i.e., rotatable cutting blades) is driven directly by the battery-powered electric motor 122.

Further, the presently disclosed aerial tree trimming system 100 and method 200 provides electric-powered aerial saw 105 including saw blade assemblies 170 that are designed to absorb the shock loading from the rotational components, wherein each blade will incorporate a slipping type clutch. In the saw blade assemblies 170, the slipping type clutch allows any rotational component subjected to impact/stoppage to absorb the kinetic energy and allow the remaining components to continue rotation without interruption.

Further, the presently disclosed aerial tree trimming system 100 and method 200 provides electric-powered aerial saw 105 may include quick-change adapter 128 that allows interchangeable cutting heads, such as, but not limited to, a standard cutting head, a re-cut cutting head, a high-altitude cutting head (i.e., light weight cutting head), a topping cutting head, and/or other type of cutting head.

Further, the presently disclosed aerial tree trimming system 100 and method 200 provides electric-powered aerial saw 105 including saw extension coupling assembly 190 that provides a quick-connect mechanism between extension sections of boom 109.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. An aerial vegetation trimming system, comprising:
   a. a saw assembly, wherein the saw assembly comprises a plurality of saw blades disposed along a length of a beam, wherein each of the plurality of saw blades comprise a first pulley and a second pulley, wherein the first pulley and the second pulley are adjacent to each other in the same horizontally plane;
   b. an electric motor operatively connected to the saw assembly, wherein the electric motor is configured to drive the plurality of saw blades via a belt and pulley system, wherein a first one of the plurality of saw blades is driven by a drive belt operatively engaged with the first pulley of the first one of the plurality of saw blades, and wherein each of the remaining ones of the plurality of saw blades are driven by their respective drive belt engaged in an alternating pattern with their respective first pulley or second pulley;
   c. at least one boom disposed between the electric motor and a vehicle, wherein the at least one boom is configured to connect the saw assembly to the vehicle; and
   d. an emergency release mechanism, comprising:
      i. a connector having an upper end with a first hook attachment point, a lower end with a load attachment point, and a second hook attachment point;
      ii. a first release hook mounted to a chassis of the vehicle and releasably attachable to the first hook attachment point; and
      iii. a second release hook mounted to a frame structure to which the aerial vegetation trimming system is mounted and releasably attachable to the second hook attachment point, wherein the load is not released unless both hooks are released.

2. The system of claim 1, wherein the vehicle comprises a helicopter.

3. The system of claim 1, wherein the electric motor is housed within a housing.

4. The system of claim 1, further comprising a battery assembly, wherein the battery assembly is configured to provide power to the electric motor.

5. The system of claim 4, wherein the battery assembly comprises one or more rechargeable batteries.

6. The system of claim 4, further comprising a battery charging station.

7. The system of claim 3, further comprising a quick change connector, wherein the quick change connector has a first end configured to be mechanically coupled to the housing of the electric motor and has a second end configured to mate with an upper end portion of the beam.

8. The system of claim 7, wherein the quick change connector is configured to allow for interchangeability of differing saw assemblies with the electric motor.

9. The system of claim 1, further comprising one or more boom extension couplings, wherein the one or more boom extension couplings are configured to couple two or more booms together in an end to end configuration.

10. The system of claim 3, wherein a lower most end of the at least one boom is connectable to the electric motor housing, and wherein an upper most end of the at least one boom is connectable to the vehicle.

11. The system of claim 1, wherein the plurality of saw blades are aligned in a common vertical plane.

12. The system of claim 1, further including any one or more of a motor controller operatively connected to the electric motor and configured for controlling one or more operations of the electric motor, a radio controller module configured to provide a wireless communications link to the motor controller and configured to provide for wireless controlled operations thereof; a system status indicator; and a battery charger module.

13. The system of claim 12, wherein the motor controller is configured to increase or decrease rpms of the electric motor based on one or more parameters and/or health conditions of the aerial vegetation trimming system.

14. The system of claim 13, wherein the one or more parameters and/or health conditions comprise one or more of load detected at the saw assembly, battery condition, component temperature, and torque.

15. The system of claim 12, wherein the motor controller is configured to provide a low rpm startup of the electric motor at initial engagement.

16. The system of claim 12, wherein the motor controller is configured to provide regenerative deceleration of the electric motor.

17. The system of claim 12, wherein the system status indicator comprises a light bar system, wherein the light bar system is configured to provide a one or more visual indicators of one or more operating parameters and/or health conditions of the aerial vegetation trimming system.

18. The system of claim 5, further comprising an onboard battery charging station, wherein the onboard battery charging station is configured to provide charging to one or more of the one or more rechargeable batteries while the system is connected to the vehicle.

19. The system of claim 1, wherein the belt and pulley system are at least partially housed within a hollow portion of the beam.

20. A method of using an aerial vegetation trimming system, the method comprising:
   a. providing an aerial vegetation trimming system, comprising:
      i. a saw assembly, wherein the saw assembly comprises a plurality of saw blades disposed along a length of a beam, wherein each of the plurality of saw blades comprise a first pulley and a second pulley, wherein the first pulley and the second pulley are adjacent to each other in the same horizontally plane;
      ii. an electric motor operatively connected to the saw assembly, wherein the electric motor is configured to drive the plurality of saw blades via a belt and pulley system, wherein a first one of the plurality of saw blades is driven by a drive belt operatively engaged with the first pulley of the first one of the plurality of saw blades, and wherein each of the remaining ones of the plurality of saw blades are driven by their respective drive belt engaged in an alternating pattern with their respective first pulley or second pulley;
      iii. at least one boom disposed between the electric motor and a vehicle, wherein the at least one boom is configured to connect the saw assembly to the vehicle; and
      iv. an emergency release mechanism, comprising:
         a connector having an upper end with a first hook attachment point, a lower end with a load attachment point, and a second hook attachment point;
         a first release hook mounted to a chassis of the vehicle and releasably attachable to the first hook attachment point; and
         a second release hook mounted to a frame structure to which the aerial vegetation trimming system is mounted and releasably attachable to the second hook attachment point, wherein the load is not released unless both hooks are released;
   b. connecting the aerial vegetation trimming system to the vehicle;
   c. positioning the vehicle with the aerial vegetation trimming system connected thereto in a desired area for vegetation trimming;
   d. activating the plurality of saw blades of the saw assembly; and
   e. performing aerial vegetation trimming operations.

\* \* \* \* \*